United States Patent
Nanjo et al.

(10) Patent No.: US 7,362,510 B2
(45) Date of Patent: Apr. 22, 2008

(54) ZOOM LENS AND IMAGE PICKUP APPARATUS

(75) Inventors: Yusuke Nanjo, Kanagawa (JP); Atsuo Minato, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/554,508

(22) PCT Filed: Feb. 25, 2005

(86) PCT No.: PCT/JP2005/003698

§ 371 (c)(1),
(2), (4) Date: Oct. 2, 2006

(87) PCT Pub. No.: WO2005/103789

PCT Pub. Date: Nov. 3, 2005

(65) Prior Publication Data

US 2007/0053079 A1    Mar. 8, 2007

(30) Foreign Application Priority Data

Apr. 20, 2004   (JP) .............................. 2004-124451

(51) Int. Cl.
*G02B 3/00*    (2006.01)
*G02B 15/14*   (2006.01)
*G03B 17/00*   (2006.01)

(52) U.S. Cl. ...................... 359/687; 359/642; 359/676; 359/683; 359/686; 396/72; 396/79

(58) Field of Classification Search ................. 396/642, 396/676, 682, 686, 687
See application file for complete search history.

(56) References Cited

U.S. PATENT DOCUMENTS 6,124,983 A    9/2000   Yahagi et al.

6,342,973 B1    1/2002   Kikuchi et al.

FOREIGN PATENT DOCUMENTS

| JP | 06-337353 | | 12/1994 |
|---|---|---|---|
| JP | 07-199069 | | 8/1995 |
| JP | 08-179206 | * | 7/1996 |
| JP | 09-211324 | | 8/1997 |
| JP | 10-232420 | | 9/1998 |
| JP | 2000-081572 | | 3/2000 |
| JP | 2000-330018 | | 11/2000 |

OTHER PUBLICATIONS

Form PCT/IB/326; International Application No. PCT/JP/2005/003698; dated Apr. 20, 2004.

(Continued)

*Primary Examiner*—Benny Q. Tieu
*Assistant Examiner*—Michael A Strieb
(74) *Attorney, Agent, or Firm*—Rader Fishman & Grauer PLLC; Ronald P. Kananen

(57) ABSTRACT

A zoom lens with a reduced overall length having a color separating prism therein and a telecentric property with a first lens group (GI) having a positive refractive power and having a fixed position, a second lens group (GII) of the variable magnification type having a negative refractive power and having a position movable for magnification variation, a third lens group (GIII) having a positive refractive power and having a fixed position and a fourth lens group (GIV) having a positive refractive power and having a position variable for adjustment of a focal position upon magnification variation and upon focusing are disposed in order from an object side. At least one face of the two convex lenses in the fourth lens group is formed from an aspheric face.

10 Claims, 15 Drawing Sheets

OTHER PUBLICATIONS

Australian Patent Office Written Opinion; Application No. SG 200507127-9; dated Apr. 20, 2004.

International Search Report dated Apr. 12, 2005.

International Search Opinion dated Apr. 12, 2005.

Form PCT/ISA/237; International Application No.: PCT/JP/2005/003698 dated Apr. 20, 2004.

Form PCT/IB/373; International Application No.: PCT/JP/2005/003698 dated Apr. 20, 2004.

Form PCT/IB/338; International Application No.: PCT/JP/2005/003698 dated Apr. 20, 2004.

* cited by examiner

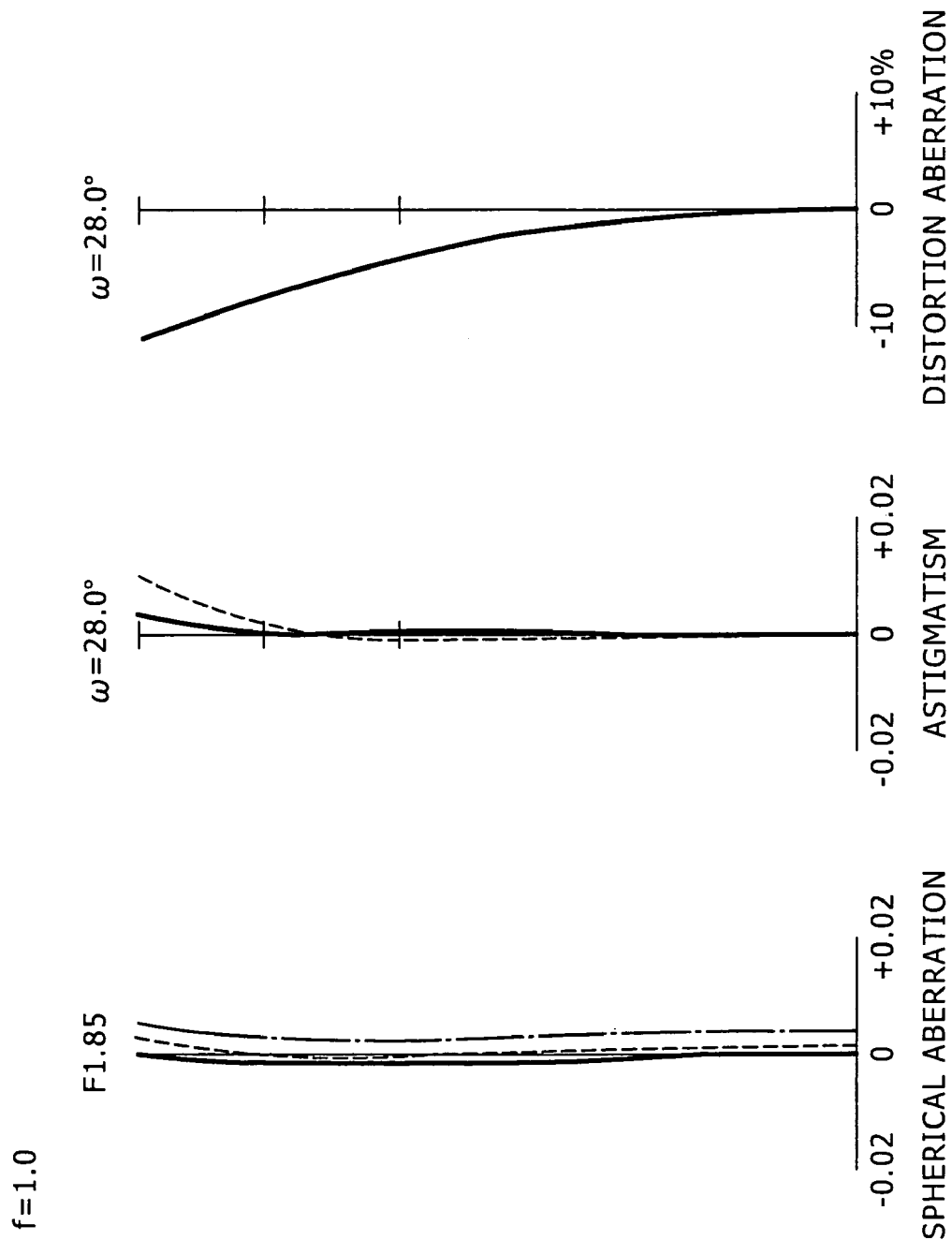

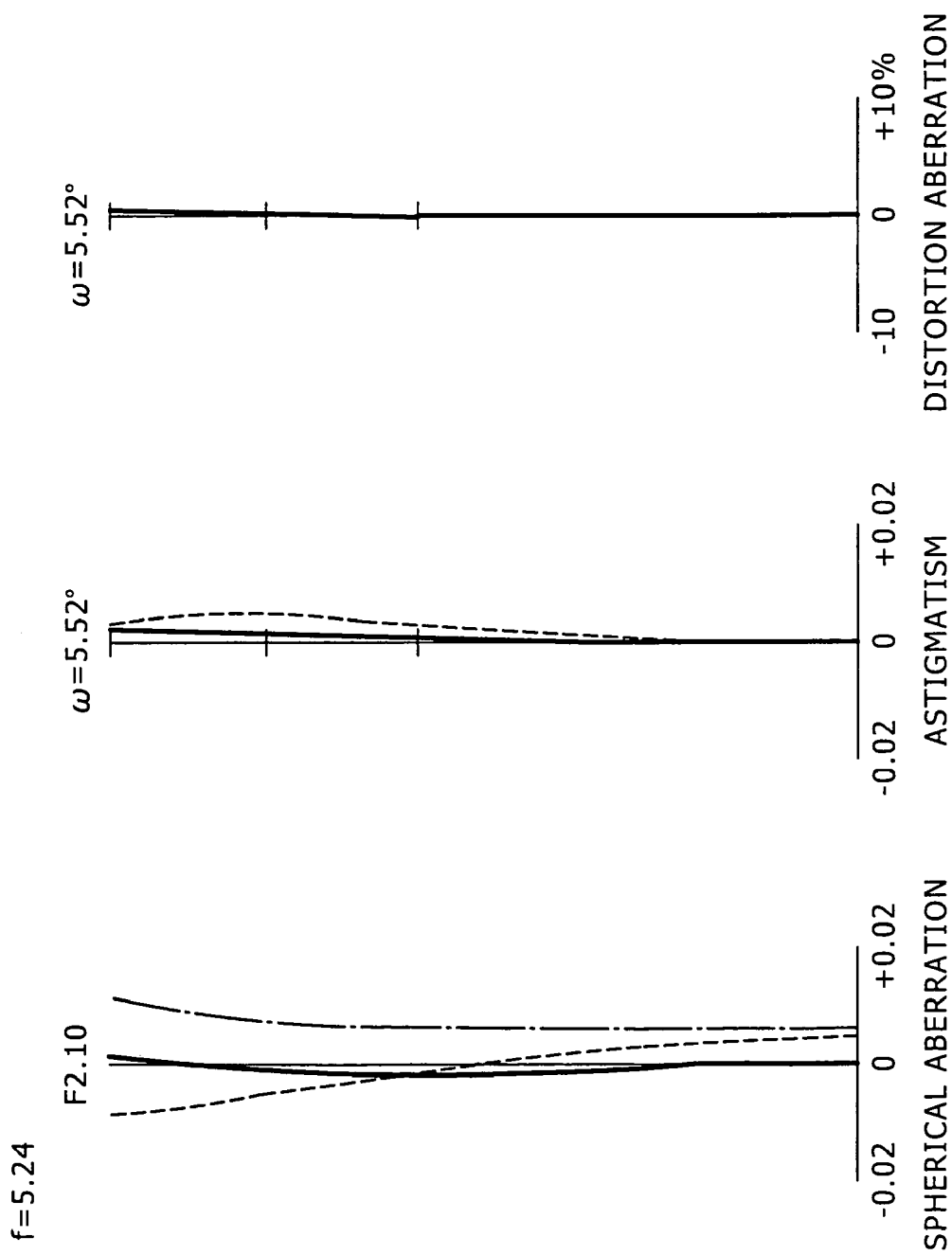

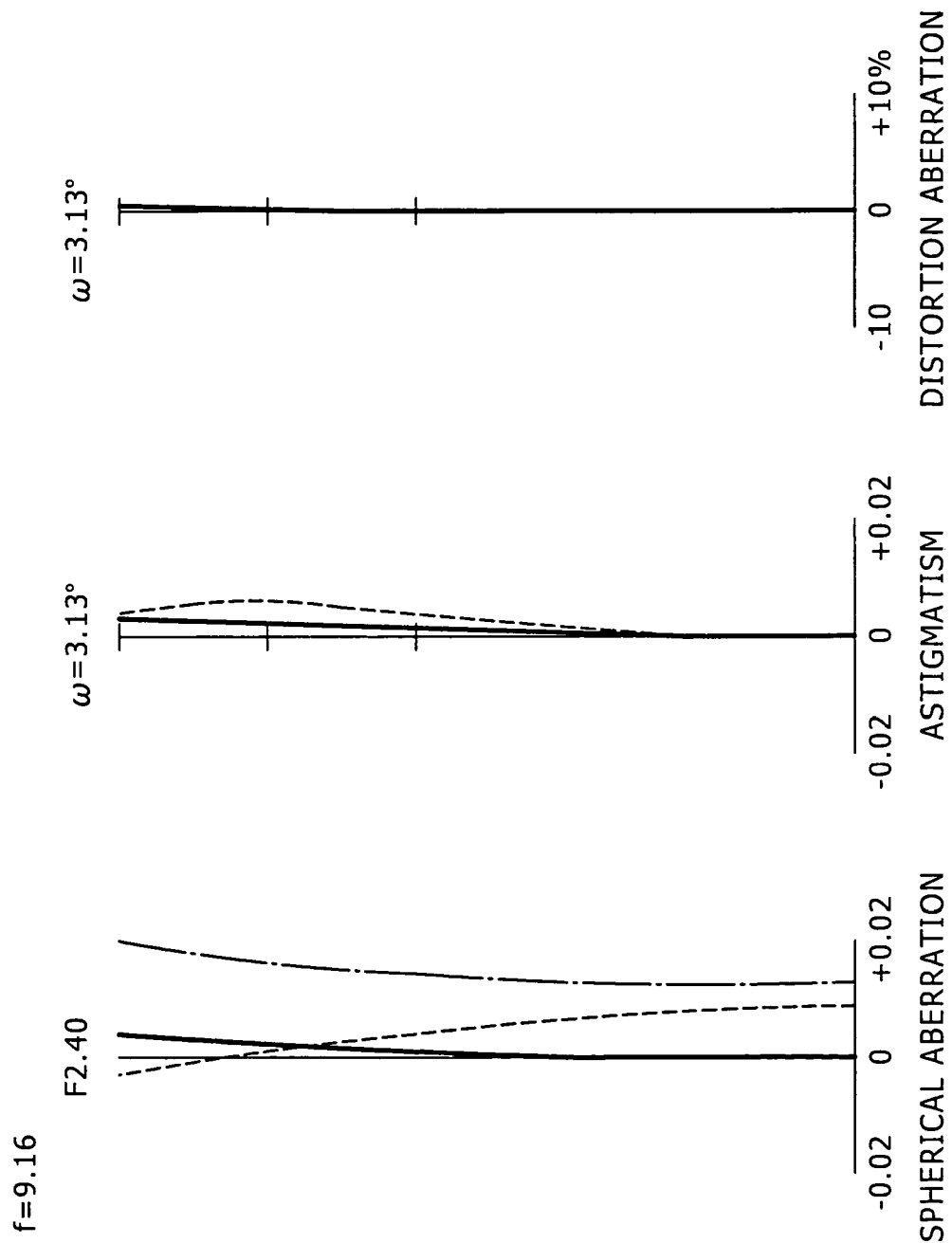

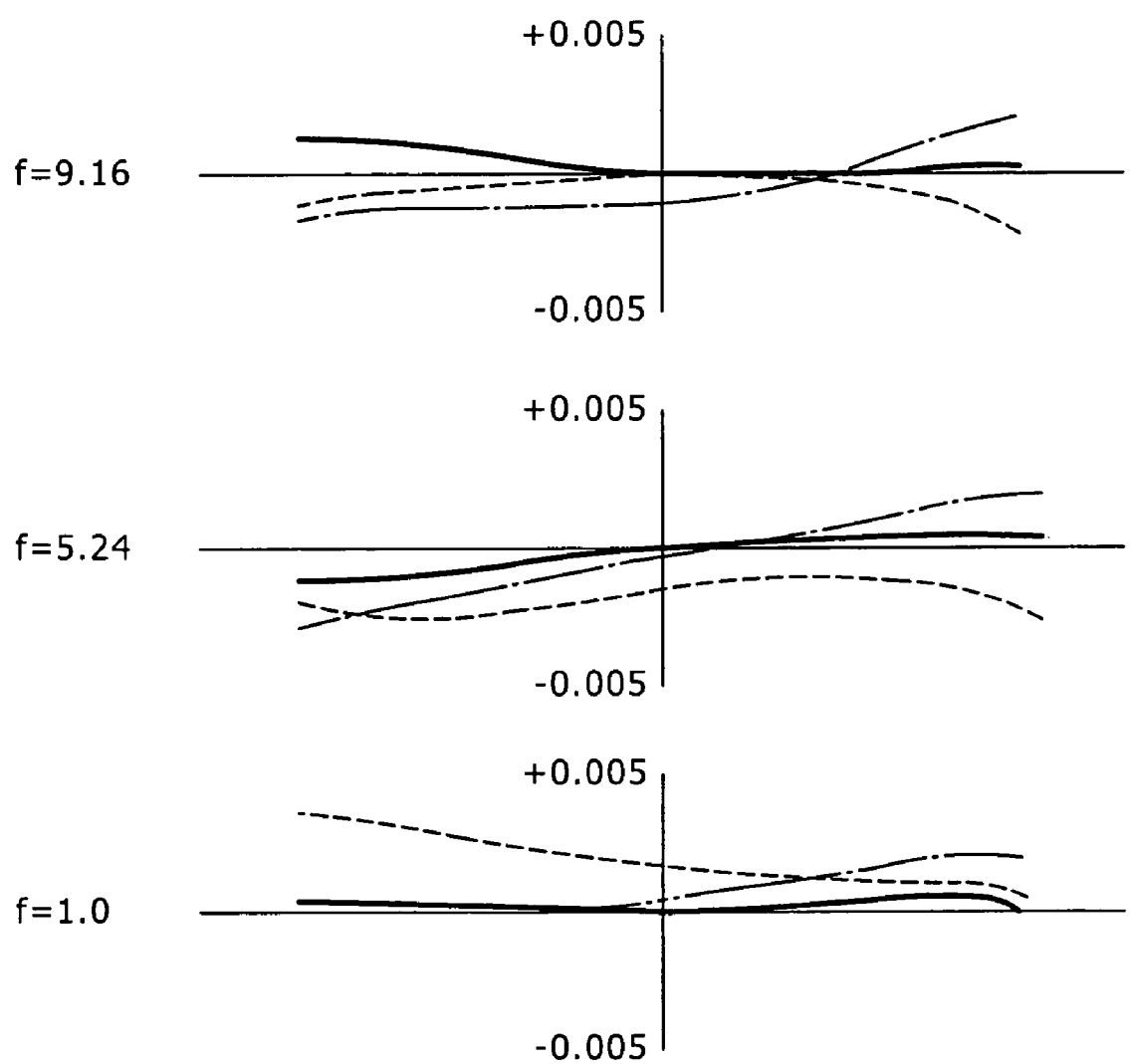

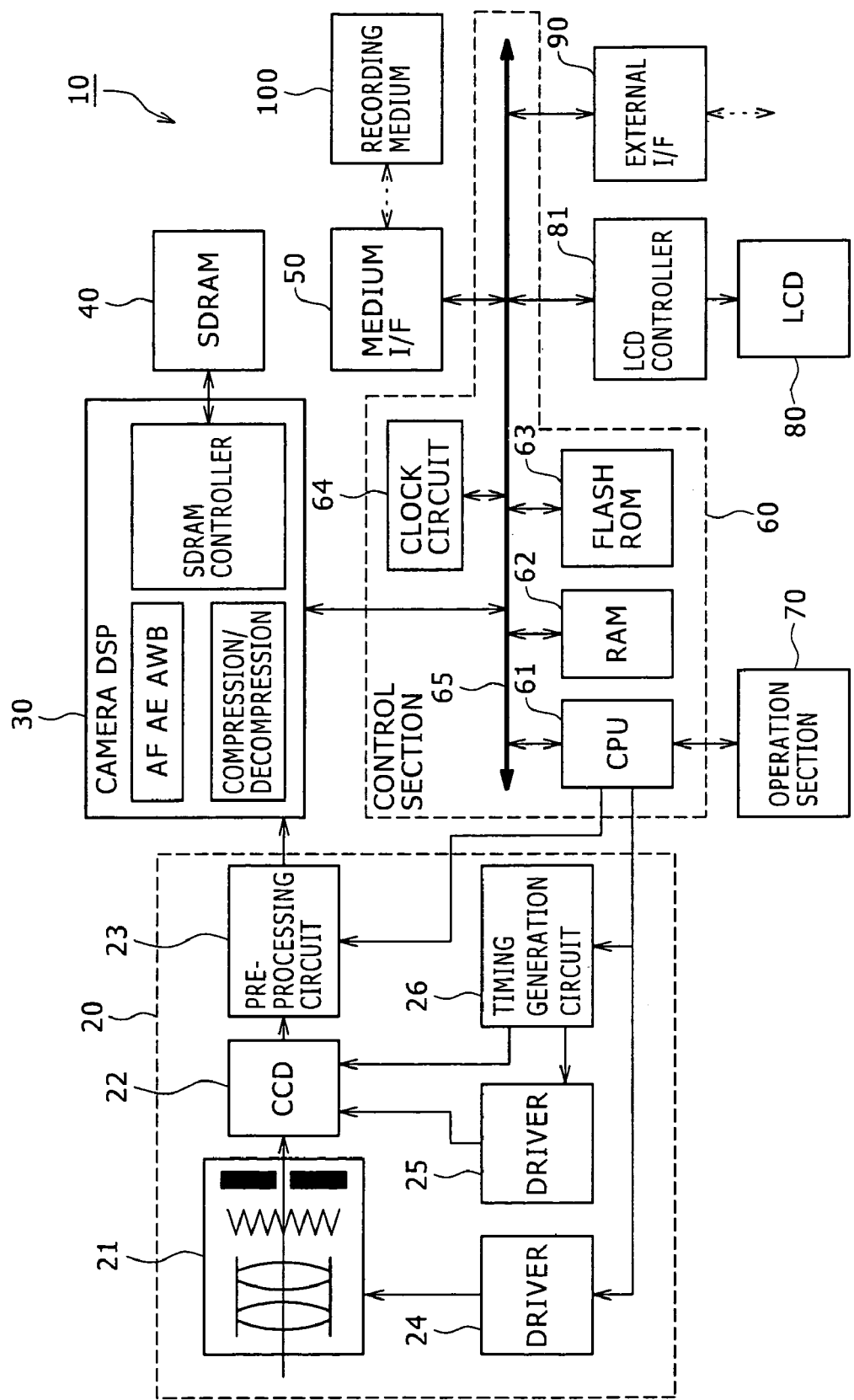

ZOOM LENS AND IMAGE PICKUP APPARATUS

TECHNICAL FIELD

This invention relates to a novel zoom lens and image pickup apparatus. More particularly, the present invention relates to a zoom lens which is suitable for use with a video camera of the three-plate type and so forth and has a high zoom ratio and besides can assure a long back focus and an image pickup apparatus in which the zoom lens is used.

BACKGROUND ART

For recent video cameras, a high picture quality is demanded together with the operability and the mobility, and in order to satisfy the demand, also those image pickup elements of a small size having a high resolution are prevailing. Together with this, a high performance zoom lens which has a high aperture ratio, a small size and a light weight and has a high magnification is demanded strongly. Further, it is preferable to reduce the number of component lenses and reduce the price of such a zoom lens as described above while a high performance is maintained.

However, a zoom lens of a high magnification generally has a large lens diameter and a large total lens length and besides requires a great number of lenses in order to achieve further strict aberration correction. Therefore, a high magnification zoom lens is generally liable to be large, heavy and expensive, and most high magnification zoom lenses are not suitable for video cameras for consumers.

As a zoom lens used principally for video cameras for consumers, a four-group inner focus type zoom lens is adopted popularly wherein first to fourth lens groups having positive, negative, positive and positive refractive powers, respectively, are disposed in order from the object side and the positions of the second and fourth lens groups are movable. An application of the four-group inner focus type zoom lens to a three-plate type video camera is disclosed, for example, in Japanese Patent Laid-open No. Hei 7-199069 and Japanese Patent Laid-open No. Hei 6-337353.

In particular, Japanese Patent Laid-open No. Hei 7-199069 discloses a zoom lens wherein the third lens group is formed from a single convex lens to form a light beam into an almost afocal or rather divergent light beam which is introduced into the fourth lens group while the fourth length group is formed from three lenses including a cemented lens of a concave lens and a convex lens and another convex lens and is configured so as to be convenient to displace the image side principal point of the fourth lens group to the image side, whereby a long back focus is assured with a small number of component lenses.

Meanwhile, according to the zoom lens disclosed in Japanese Patent Laid-open No. Hei 6-337353, the refractive power of the third lens group is set lower so that a divergent light flux is introduced into the fourth lens group to make the back focus longer, and the fourth lens group is configured such that the image side principal point cannot be displaced toward the image and does not contribute to assurance of the back focus. However, it is considered that the fourth lens group performs correction of chromatic aberration rather excessively to correct magnification chromatic aberration. It is considered that, since the axial chromatic aberration is corrected extremely excessively because correction of the magnification chromatic aberration is performed by the fourth lens group, the correction of the axial chromatic aberration by the fourth lens group is suppressed from becoming excessive by such arrangement of the materials that the third lens group positioned in the proximity of the iris generates axial chromatic aberration.

In a three-plate type video camera, a long back focus for allowing a color separating prism having a great thickness (having a great length in the axial direction) to be disposed behind the lenses is required. Further, since the spectral characteristic of a dichroic mirror for color separation has an angle dependency, it is necessary to set the exit pupil to a state near to a telecentric state so that a uniform spectral characteristic may be obtained over an entire screen. If it is tried to implement a long back focus and a telecentric exit pupil, then the overall length is liable to increase similarly to the zoom lens disclosed in Japanese Patent Laid-open No. Hei 6-337353.

Further, in a three-plate type video camera, since three image pickup elements are used, the price increases when compared with a single-plate camera, and it is demanded that the three-plate type video camera naturally exhibit a high picture quality as is demanded for a model of a high price.

A three-plate type video camera catches images individually of the three primary colors of R, G and B by image pickup elements and superposes resulting electric signals to produce a color image. Therefore, registration adjustment of adjusting relative positions of the image pickup elements is significant, and if the registration adjustment is not sufficient, then a color which the image pickup subject does not have appears at a contour portion of the image or the like. However, even if the registration adjustment is performed with a sufficiently high degree of accuracy, if the image pickup lens has some magnification chromatic aberration, then color offset similar to that which appears when the registration adjustment is insufficient appears and degrades the quality of the image. For the picture quality expected for the three-plate type video camera, it is significant that not only the MTF value is higher than that of the single-plate type video camera but also particularly the magnification chromatic aberration is corrected well.

With the zoom lens disclosed in Japanese Patent Laid-open No. Hei 7-199069, the degree of freedom in chromatic aberration correction is low because the third lens group is formed from a single lens, and it is difficult to correct both of the axial chromatic aberration and the magnification chromatic aberration well.

The present invention has been made in view of such a situation as described above, and it is a subject of the present invention to provide a zoom lens which can be formed with a reduced overall length while physically necessary factors including a long back focus for allowing arrangement of a color separating prism therein and a telecentric property and besides can correct various aberrations including the chromatic aberration to a level suitable for an expensive three-plate type video camera and which includes a comparatively small number of component lenses and an image pickup apparatus which uses the zoom lens.

SUMMARY OF INVENTION

In order to solve the subject described above, a zoom lens of the present invention includes a first lens group having a positive refractive power and having a fixed position, a second lens group of the variable magnification type having a negative refractive power and having a position movable for magnification variation, a third lens group having a positive refractive power and having a fixed position and a fourth lens group having a positive refractive power and having a position variable for adjustment of a focal position upon magnification variation and upon focusing, disposed in order from an object side. Meanwhile, an image pickup apparatus of the present invention includes a zoom lens wherein a first lens group having a positive refractive power and having a fixed position, a second lens group of the variable magnification type having a negative refractive power and having a position movable for magnification variation, a third lens group having a positive refractive power and having a fixed position and a fourth lens group having a positive refractive power and having a position variable for adjustment of a focal position upon magnification variation and upon focusing are disposed in order from an object side, and an image pickup section for picking up an optical image formed by the zoom lens. Further, in both of the zoom lens and the image pickup apparatus, the first lens group includes a cemented lens of a first lens in the form of a concave lens and a second lens in the form of a convex lens and a third lens in the form of a convex meniscus lens having a convex face directed to the object side, disposed in order from the object side. The second lens group includes a fourth lens in the form of a concave lens and a cemented lens of a fifth lens in the form of a biconcave lens and a sixth lens in the form of a convex lens, disposed in order from the object side. The third lens group includes a two-element or three-element cemented lens including a seventh lens in the form of a biconvex lens positioned nearest to the object side and an eighth lens in the form of a concave lens bonded to the seventh lens. The fourth lens group includes a cemented lens of a concave lens having a concave face directed to the object side and a convex lens and a biconvex lens, and at least one face of the two convex lenses in the fourth lens group is formed from an aspheric face. Further, where fw represents the focal distance of the entire system at the wide-angle end state, fIII the focal distance of the third lens group, fIV the focal distance of the fourth lens group, HIV' the image side principal point of the fourth lens group, φ32 the refractive power of the bonded faces of the biconvex lens nearest to the object side in the third lens group and the next concave lens (where φ32=(n8−n7)/r32 where n7 is the refractive index of the seventh lens on the d line, n8 the refractive index of the eighth lens on the d line, and r32 the radius of curvature of the bonded faces of the seventh lens and the eighth lens), V IV the equivalent Abbe number where it is assumed that the fourth lens group is a thin closely contacting type lens group (where 1/v IV=fIV{1/(f41·v 41)+1/(f42·v 42)+1/(f43·v 43)} where f41 is the focal distance of the concave lens nearest to the object side in the fourth lens group in the air, f42 the focal distance of the convex lens cemented to the above-mentioned concave lens in the fourth lens group in the air, f43 the focal distance of the biconvex lens nearest to the image side in the fourth lens group, v 41 the Abbe number of the material of the concave lens nearest to the object side in the fourth lens group, v 42 the Abbe number of the material of the convex lens cemented to the concave lens of the fourth lens group, and v 43 the Abbe number of the material of the biconvex lens nearest to the image side of the fourth lens group), and v III the equivalent Abbe number where it is assumed that the third lens group is a thin closely contacting lens group (where 1/v III=fIII{1/(f31·v 31)}+1/(f32·v 32) in the case wherein the third lens group is a two-element cemented lens but 1/v III=fIII{1/(f31·v 31)+1/(f32·v 32)+1/(f33·v 33)} in the case wherein the third lens group is a three-element cemented lens where f31 is the focal distance of the convex lens nearest to the object side in the third lens group in the air, f32 the focal distance of the concave lens cemented to the above-mentioned convex lens of the third lens group in the air, f33 the focal distance of the convex lens nearest to the image side in the case wherein the third lens group is a three-element cemented lens, v 31 the Abbe number of the material of the convex lens nearest to the object side in the third lens group, v 32 the Abbe number of the material of the concave lens cemented to the convex lens of the third lens group, and v 33 the Abbe number of the material of the convex lens nearest to the image side, the following conditional expressions:

$$7.0 < fIII/fw < 10.0 \qquad (1)$$

$$0.007 < HIV'/fIV < 0.07 \qquad (2)$$

$$1.8 < fIII/fIV < 3.0 \qquad (3)$$

$$-0.1 < \phi 32 < -0.05 \qquad (4)$$

$$-0.02 < 1/VIV < -0.012 \qquad (5)$$

and $$0.03 < 1/VIII < 0.07 \qquad (6)$$

are satisfied.

Accordingly, according to the present invention, the degree of freedom in chromatic aberration correction increases, and miniaturization is achieved while a long back focus is assured. Further, both of miniaturization and enhancement in performance are achieved by arrangement of refractive powers and appropriate arrangement of media.

According to the present invention, a zoom lens wherein a first lens group having a positive refractive power and having a fixed position, a second lens group of the variable magnification type having a negative refractive power and having a position movable for magnification variation, a third lens group having a positive refractive power and having a fixed position and a fourth lens group having a positive refractive power and having a position variable for adjustment of a focal position upon magnification variation and upon focusing are disposed in order from an object side, is characterized in that the first lens group includes a cemented lens of a first lens in the form of a concave lens and a second lens in the form of a convex lens and a third lens in the form of a convex meniscus lens having a convex face directed to the object side, disposed in order from the object side, that the second lens group includes a fourth lens in the form of a concave lens and a cemented lens of a fifth lens in the form of a biconcave lens and a sixth lens in the form of a convex lens, disposed in order from the object side, that the third lens group includes a two-element or three-element cemented lens including a seventh lens in the form of a biconvex lens positioned nearest to the object side and an eighth lens in the form of a concave lens bonded to the seventh lens, that the fourth lens group includes a cemented lens of a concave lens having a concave face directed to the object side and a convex lens and a biconvex lens, and at least one face of the two convex lenses in the fourth lens group is formed from an aspheric face, and that, where fw represents the focal distance of the entire system at the wide-angle end state, fIII the focal distance of the third lens group, fIV the focal distance of the fourth lens group, HIV' the image side principal point of the fourth lens group, φ32 the refractive power of the bonded faces of the biconvex lens nearest to the object side in the third lens group and the next concave lens (where φ32=(n8−n7)/r32 where n7 is the refractive index of the seventh lens on the d line, n8 the refractive index of the eighth lens on the d line, and r32 the radius of curvature of the bonded faces of the seventh lens and the eighth lens), v IV the equivalent Abbe number where it is assumed that the fourth lens group is a thin closely contacting type lens group (where 1/v IV=fIV{1/(f41·v 41)+1/(f42·v 42)+1/(f43·v 43)} where f41 is the focal distance of the concave lens nearest to the object side in the fourth lens group in the air, f42 the focal distance of the convex lens cemented to the above-mentioned concave lens in the fourth lens group in the air, f43 the focal distance of the biconvex lens nearest to the image side in the fourth lens group, v 41 the Abbe number of the material of the concave lens nearest to the object side in the fourth lens group, v 42 the Abbe number of the material of the convex lens cemented to the concave lens of the fourth lens group, and v 43 the Abbe number of the material of the biconvex lens nearest to the image side of the fourth lens group), and v III the equivalent Abbe number where it is assumed that the third lens group is a thin closely contacting lens group (where 1/v III=fIII{1/(f31·v 31)}+1/(f32·v 32) in the case wherein the third lens group is a two-element cemented lens but 1/v III=fIII{1/(1/(f31·v 31)+1/(f32·v 32)+1/(f33·v 33)} in the case wherein the third lens group is a three-element cemented lens where f31 is the focal distance of the convex lens nearest to the object side in the third lens group in the air, f32 the focal distance of the concave lens cemented to the above-mentioned convex lens of the third lens group in the air, f33 the focal distance of the convex lens nearest to the image side in the case wherein the third lens group is a three-element cemented lens, v 31 the Abbe number of the material of the convex lens nearest to the object side in the third lens group, v 32 the Abbe number of the material of the concave lens cemented to the convex lens of the third lens group, and v 33 the Abbe number of the material of the convex lens nearest to the image side, the following conditional expressions:

$$7.0<fIII/fw<10.0 \quad (1)$$

$$0.007<HIV'/fIV<0.07 \quad (2)$$

$$1.8<fIII/fIV<3.0 \quad (3)$$

$$-0.1<\phi32<-0.05 \quad (4)$$

$$-0.02<1/vIV<-0.012 \quad (5)$$

and $$0.03<1/vIII<0.07 \quad (6)$$

are satisfied.

Meanwhile, according to the present invention, an image pickup apparatus which includes a zoom lens wherein a first lens group having a positive refractive power and having a fixed position, a second lens group of the variable magnification type having a negative refractive power and having a position movable for magnification variation, a third lens group having a positive refractive power and having a fixed position and a fourth lens group having a positive refractive power and having a position variable for adjustment of a focal position upon magnification variation and upon focusing are disposed in order from an object side, and an image pickup section for picking up an optical image formed by the zoom lens, is characterized in that the first lens group in the zoom lens includes a cemented lens of a first lens in the form of a concave lens and a second lens in the form of a convex lens and a third lens in the form of a convex meniscus lens having a convex face directed to the object side, disposed in order from the object side, that the second lens group includes a fourth lens in the form of a concave lens and a cemented lens of a fifth lens in the form of a biconcave lens and a sixth lens in the form of a convex lens, disposed in order from the object side, that the third lens group includes a two-element or three-element cemented lens including a seventh lens in the form of a biconvex lens positioned nearest to the object side and an eighth lens in the form of a concave lens bonded to the seventh lens, that the fourth lens group includes a cemented lens of a concave lens having a concave face directed to the object side and a convex lens and a biconvex lens, and at least one face of the two convex lenses in the fourth lens group is formed from an aspheric face, and that, where fw represents the focal distance of the entire system at the wide-angle end state, fIII the focal distance of the third lens group, fIV the focal distance of the fourth lens group, HIV' the image side principal point of the fourth lens group, φ32 the refractive power of the bonded faces of the biconvex lens nearest to the object side in the third lens group and the next concave lens (where φ32=(n8−n7)/r32 where n7 is the refractive index of the seventh lens on the d line, n8 the refractive index of the eighth lens on the d line, and r32 the radius of curvature of the bonded faces of the seventh lens and the eighth lens), v IV the equivalent Abbe number where it is assumed that the fourth lens group is a thin closely contacting type lens group (where 1/v IV=fIV{1/(f41·v 41)+1/(f42·v 42)+1/(f43·v 43)} where f41 is the focal distance of the concave lens nearest to the object side in the fourth lens group in the air, f42 the focal distance of the convex lens cemented to the above-mentioned concave lens in the fourth lens group in the air, f43 the focal distance of the-biconvex lens nearest to the image side in the fourth lens group, v 41 the Abbe number of the material of the concave lens nearest to the object side in the fourth lens group, v 42 the Abbe number of the material of the convex lens cemented to the concave lens of the fourth lens group, and v 43 the Abbe number of the material of the biconvex lens nearest to the image side of the fourth lens group), and v III the equivalent Abbe number where it is assumed that the third lens group is a thin closely contacting lens group (where 1/v III=fIII{1/(f31·v 31)}+1/(f32·v 32) in the case wherein the third lens group is a two-element cemented lens but 1/v III=fIII{1/(f31·v 31)+1/(f32·v 32)+1/(f33·v 33)} in the case wherein the third lens group is a three-element cemented lens where f31 is the focal distance of the convex lens nearest to the object side in the third lens group in the air, f32 the focal distance of the concave lens cemented to the above-mentioned convex lens of the third lens group in the air, f33 the focal distance of the convex lens nearest to the image side in the case wherein the third lens group is a three-element cemented lens, v 31 the Abbe number of the material of the convex lens nearest to the object side in the third lens group, v 32 the Abbe number of the material of the concave lens cemented to the convex lens of the third lens group, and v 33 the Abbe number of the material of the convex lens nearest to the image side, the following conditional expressions:

$$7.0<fIII/fw<10.0 \quad (1)$$

$$0.007<HIV'/fIV<0.07 \quad (2)$$

$$1.8<fIII/fIV<3.0 \quad (3)$$

$$-0.1 < \phi 32 < -0.05 \quad (4)$$

$$-0.02 < 1/vIV < -0.012 \quad (5)$$

and $$0.03 < 1/vIII < 0.07 \quad (6)$$

are satisfied.

Accordingly, according to the present invention, the zoom lens makes it possible to insert a color separating prism into the back focus by weakening the refractive index of the third lens group so that a divergent light flux is introduced into the fourth lens group to elongate the back focus. Further, the zoom lens makes it possible to perform correction of the magnification chromatic aberration by configuring the fourth lens group such that the image side principal point cannot be displaced rather near to the image to perform correction of the chromatic aberration rather excessively. Furthermore, the zoom lens achieves both miniaturization and enhancement in performance by configuring the zoom lens so as to satisfy the conditional expressions (1) to (6) to make the refractive power arrangement and the arrangement of the media appropriate.

According to the present invention, the first lens group and the second lens group satisfy the following conditional expressions (7) $1.77 < (n1+n2+n3)/3$ and (8) $1.83 < (n4+n5+n6)/3$ where n1 is the refractive index of the first lens at the d line, n2 the refractive index of the second lens at the d line, n3 the refractive index of the third lens at the d line, n4 the refractive index of the fourth lens at the d line, n5 the refractive index of the fifth lens at the d line, and n6 the refractive index of the sixth lens at the d line. Therefore, further miniaturization and better aberration correction can be achieved.

According to the present invention, the third lens group includes a cemented lens of a seventh lens in the form of a biconvex lens whose face on the object side is formed as an aspheric face and an eighth lens in the form of a concave meniscus lens, disposed in order from the object side. Therefore, the degree of freedom in correction of various aberrations increases further.

According to the present invention, the third lens group includes a cemented lens of a seventh lens in the form of a biconvex lens and an eighth lens in the form of a concave meniscus lens whose face on the image side is formed as an aspheric face, disposed in order from the object side. Therefore, the degree of freedom in correction of various aberrations increases further.

According to the present invention, the third lens group includes a three-element cemented lens of a seventh lens in the form of a biconvex lens, an eighth lens in the form of a biconcave lens and a ninth lens in the form of a biconvex lens, disposed in order from the object side. Therefore, the degree of freedom in correction of various aberrations increases further.

BRIEF DESCRIPTION OF DRAWINGS

FIG. 11 shows aberration diagrams of a numerical value working example 3 wherein particular numerical values are applied to the second embodiment together with FIGS. 12 to 14 and is a view illustrating spherical aberration, astigmatism and distortion aberration at a wide-angle end state;

FIG. 12 is a view illustrating spherical aberration, astigmatism and distortion aberration at an intermediate focal position;

FIG. 13 is a view illustrating spherical aberration, astigmatism and distortion aberration at a telescopic end state;

FIG. 14 is a view illustrating lateral aberration at 80% of an image height at the wide-angle end state, intermediate focal position and telescopic end state; and FIG. 15 is a block diagram showing an embodiment of an image pickup apparatus of the present invention.

BEST MODE FOR CARRYING OUT THE INVENTION

In the following, the best mode for carrying out a zoom lens and an image pickup apparatus of the present invention is described with reference to the accompanying drawings.

First, an outline of-a configuration of a zoom lens is described with reference to FIGS. 1 and 10.

Figure 1:
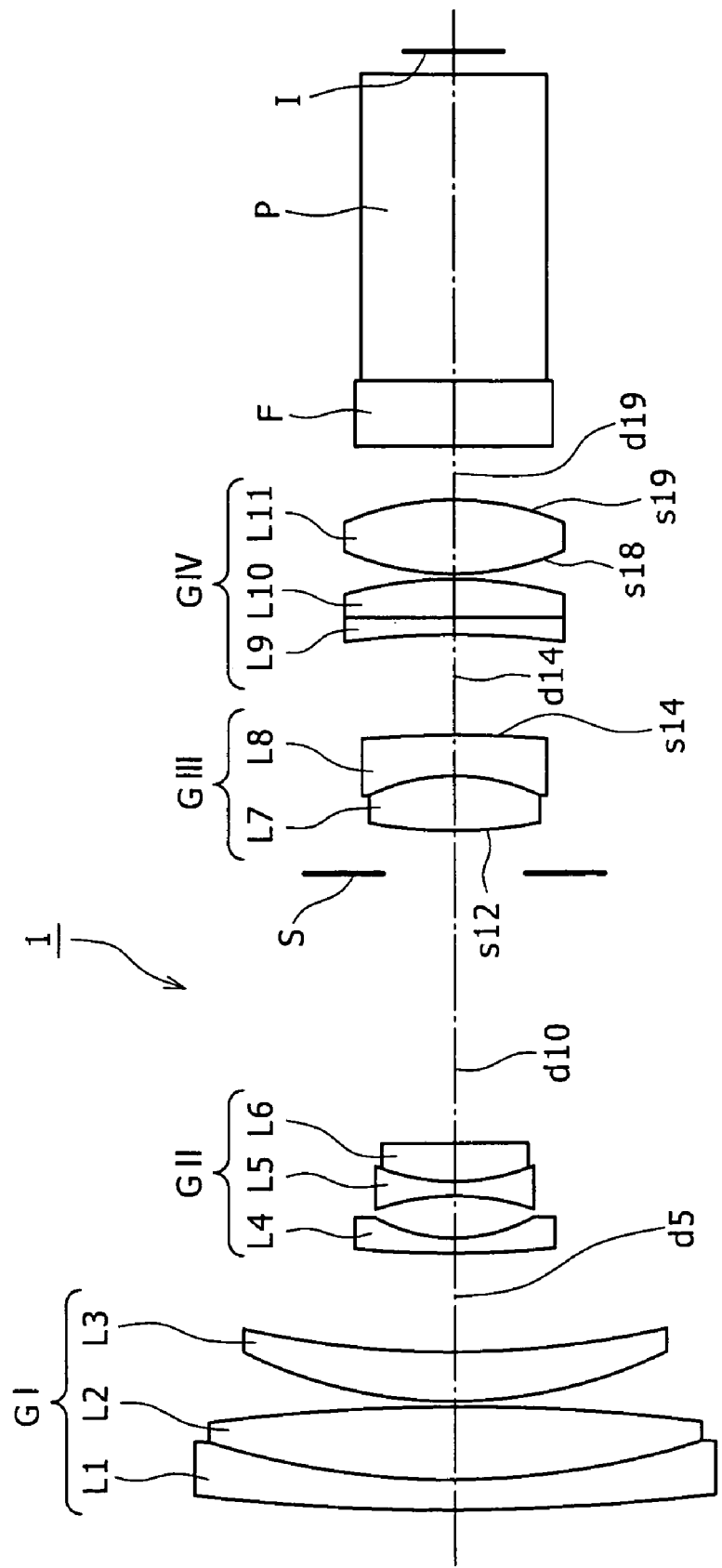
FIG. 1 shows a first embodiment of a zoom lens of the present invention together with FIGS. 2 to 9 and is a view showing a lens configuration.
Figure 2:
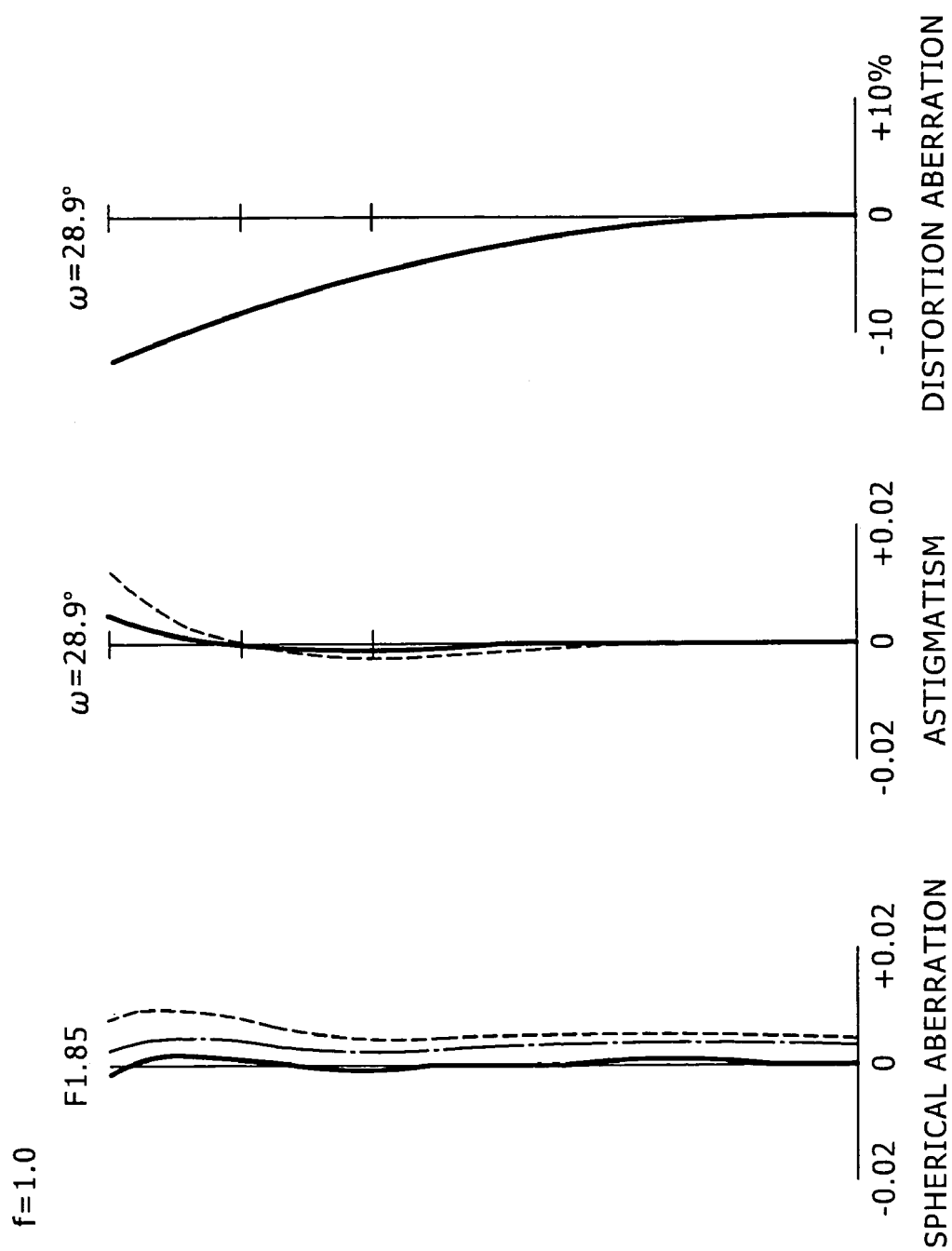
FIG. 2 shows chromatic aberration diagrams of a numerical value working example 1 where particular numerical values are applied to the first embodiment together with FIGS. 3 to 5 and is a view illustrating spherical aberration, astigmatism and distortion aberration at a wide-angle end state.
Figure 3:
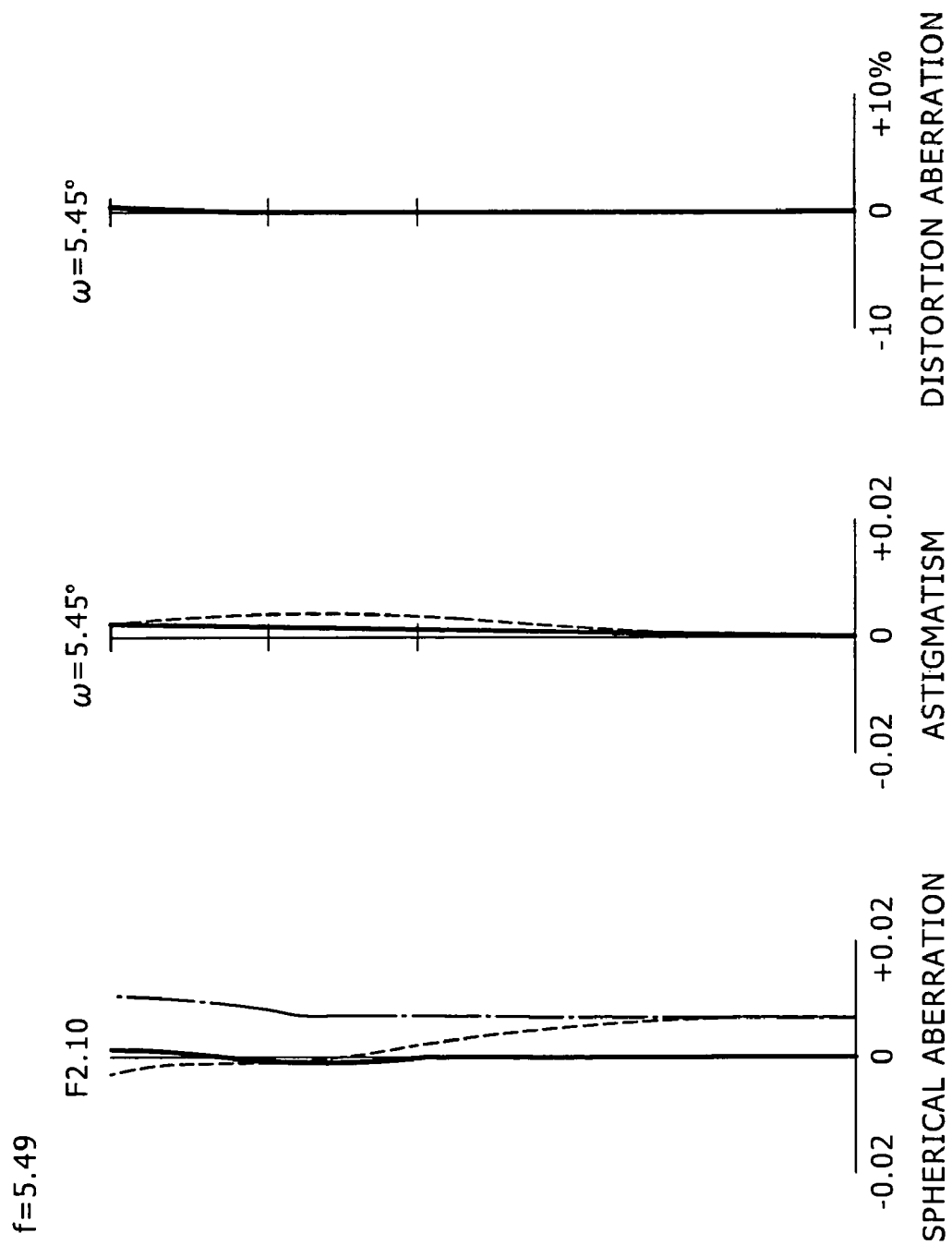
FIG. 3 is a view illustrating spherical aberration, astigmatism and distortion aberration at an intermediate focal position.
Figure 4:
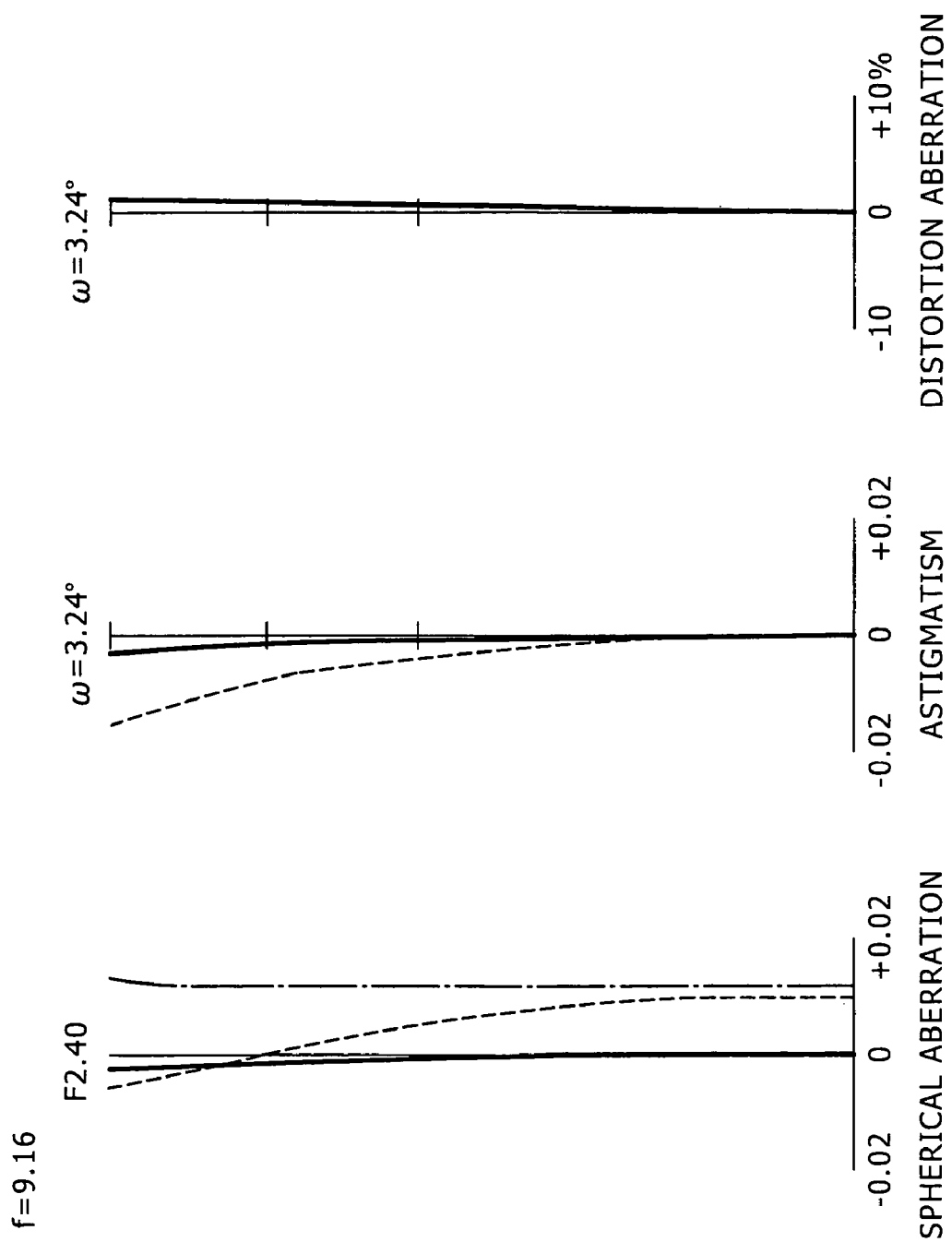
FIG. 4 is a view illustrating spherical aberration, astigmatism and distortion aberration at a telescopic end state.
Figure 5:
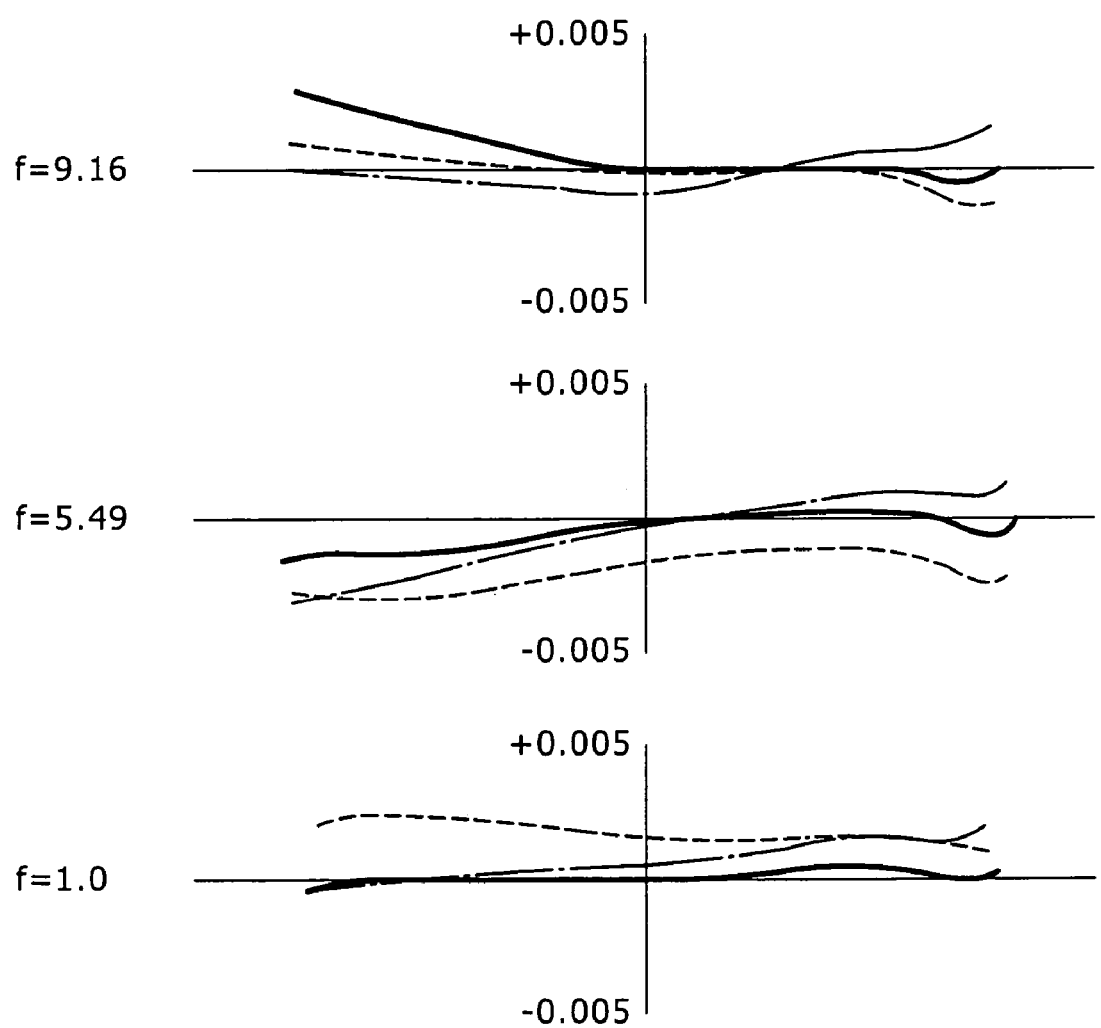
FIG. 5 is a view illustrating lateral aberration at 80% of an image height at the wide-angle end state, intermediate focal position and telescopic end state.
Figure 6:
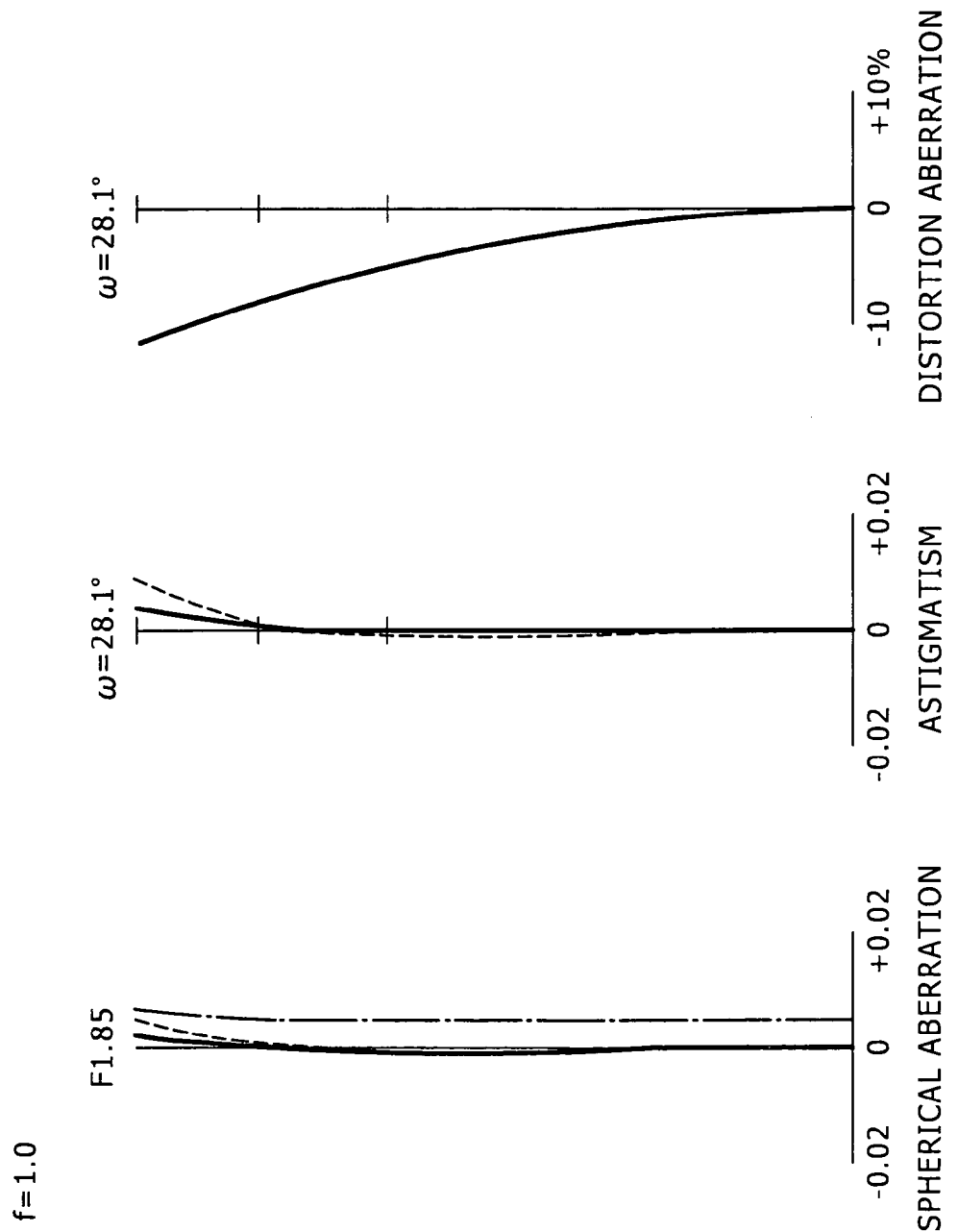
FIG. 6 shows aberration diagrams of a numerical value working example 2 wherein different particular numerical values from those in the numerical value working example 1 are applied to the first embodiment together with FIGS. 7 to 9 and is a view illustrating spherical aberration, astigmatism and distortion aberration at a wide-angle end state.
Figure 7:
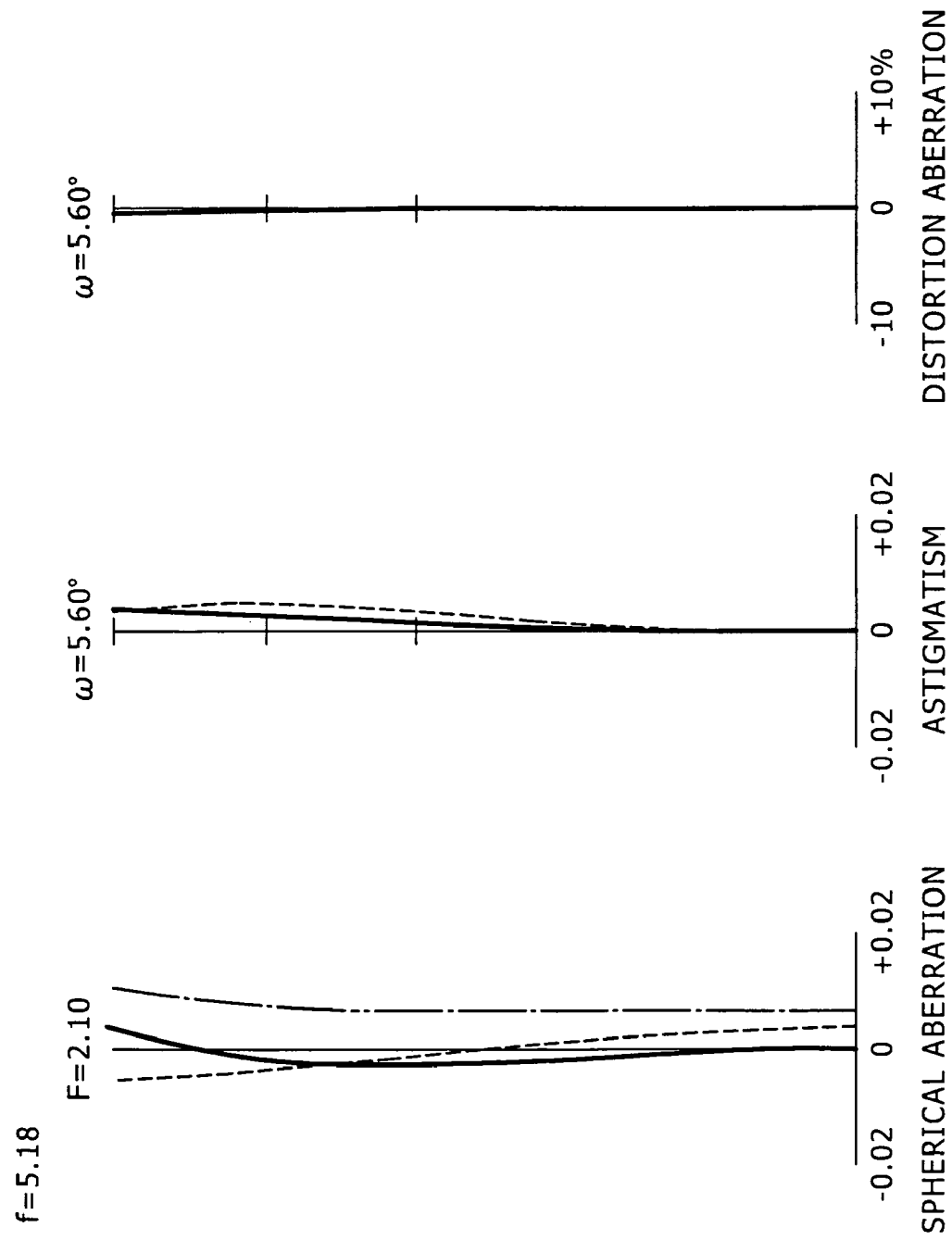
FIG. 7 is a view illustrating spherical aberration, astigmatism and distortion aberration at an intermediate focal position.
Figure 8:
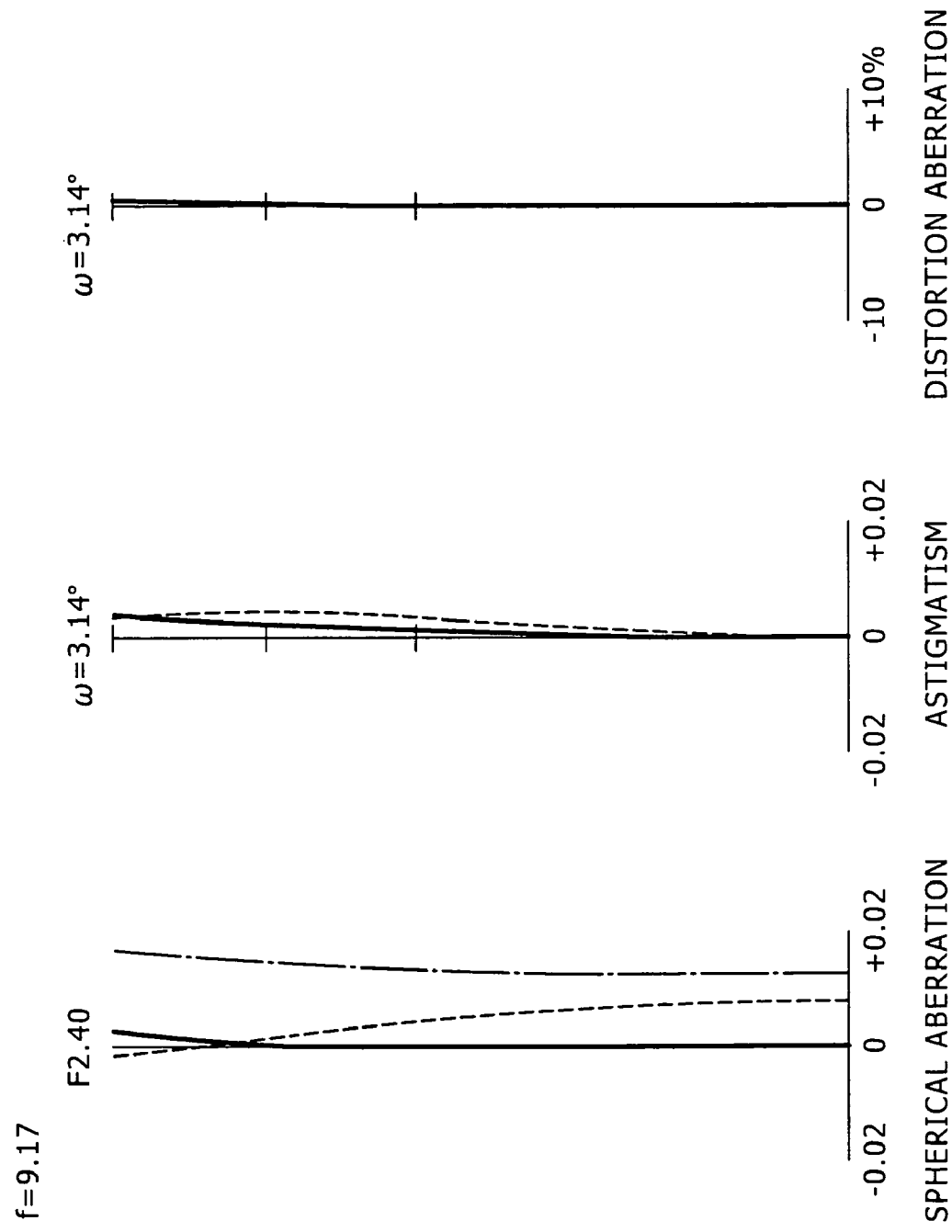
FIG. 8 is a view illustrating spherical aberration, astigmatism and distortion aberration at a telescopic end state.
Figure 9:
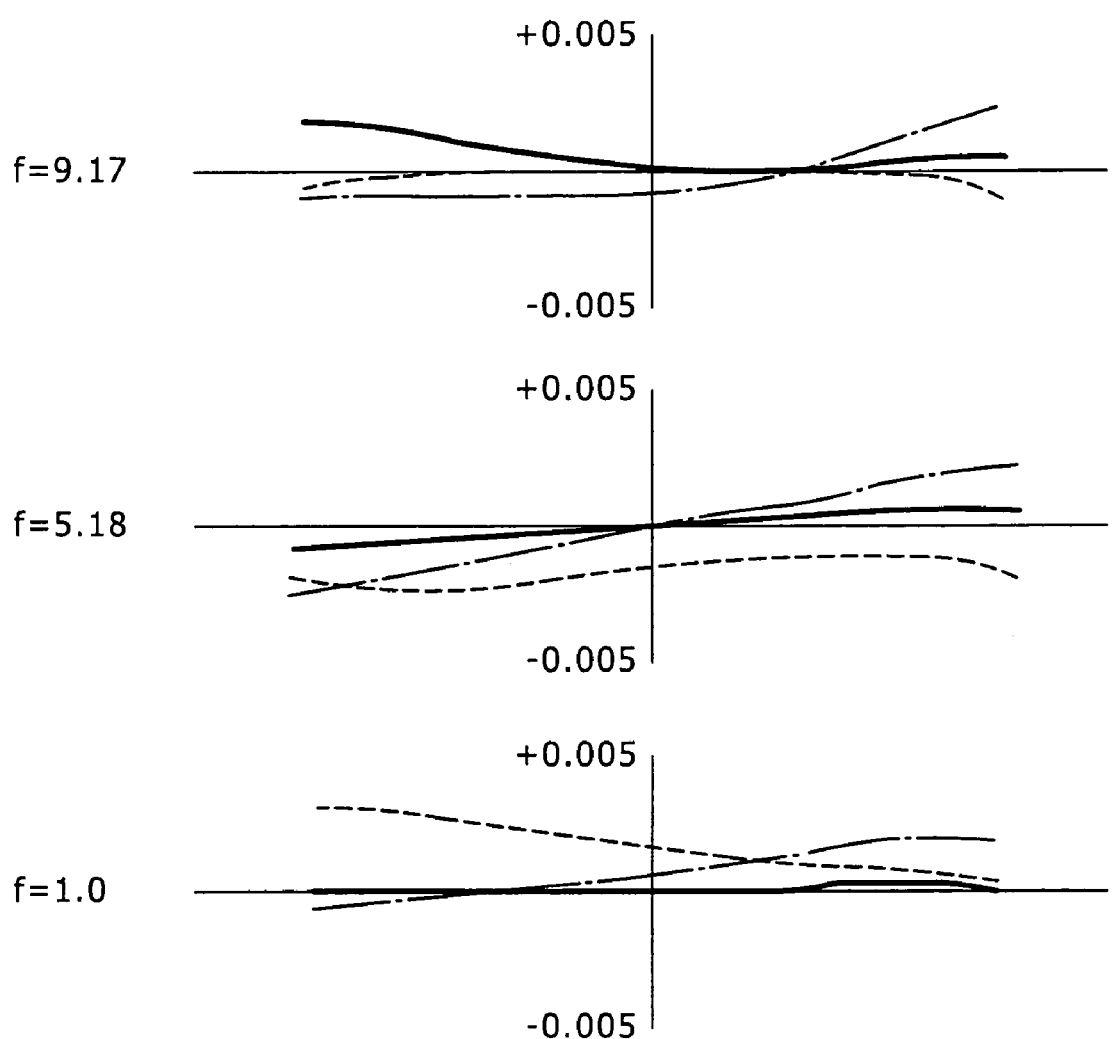
FIG. 9 is a view illustrating lateral aberration at 80% of an image height at the wide-angle end state, intermediate focal position and telescopic end state.

FIG. 1 is a view showing a lens configuration of a zoom lens 1 according to a first embodiment. The zoom lens 1 is a zoom lens of the so-called four-group inner focus type and includes a first lens group GI having a positive refractive power and having a fixed position, a second lens group GII of the variable magnification type having a negative refractive power and having a position variable for magnification variation, a third lens group GIII having a positive refractive power and having a fixed position, and a fourth lens group GIV having a positive refractive power and having a position variable for adjustment of a focal position upon magnification variation and upon focusing, disposed in order from the object side. The first lens group GI is formed from a cemented lens of a first lens L1 in the form of a concave lens and a second lens L2 in the form of a convex lens and a third lens L3 in the form of a convex meniscus lens having a convex face directed to the object side, disposed in order from the object side. The second lens group GII includes a fourth lens L4 in the form of a concave lens and a cemented lens of a fifth lens L5 in the form of a biconcave lens and a sixth lens L6 in the form of a convex lens, disposed in order from the object side. The third lens group GIII includes a cemented lens of a seventh lens L7 in the form of a biconvex lens and an eighth lens L8 in the form of a concave meniscus lens, disposed in order from the object side. In a numerical value working example 1 described later, the face of the seventh lens L7 directed to the object side is formed as an aspheric face. In a numerical value working example 2, the face of the eighth lens L8 directed to the image side is formed as an aspheric face. The fourth lens group GIV includes a cemented lens of a ninth lens L9 in the form of a concave lens having a concave face directed to the object side and a tenth lens L10 in the form of a convex lens and an eleventh lens L11 in the form of a biconvex lens, disposed in order from the object side. At least one face of the tenth lens L10 or the eleventh lens L11 is formed from an aspheric face (it is to be noted that, in a numerical value working example 1 and a numerical value working example 2, the opposite faces of the eleventh lens are each formed from an aspheric face.

Figure 10:
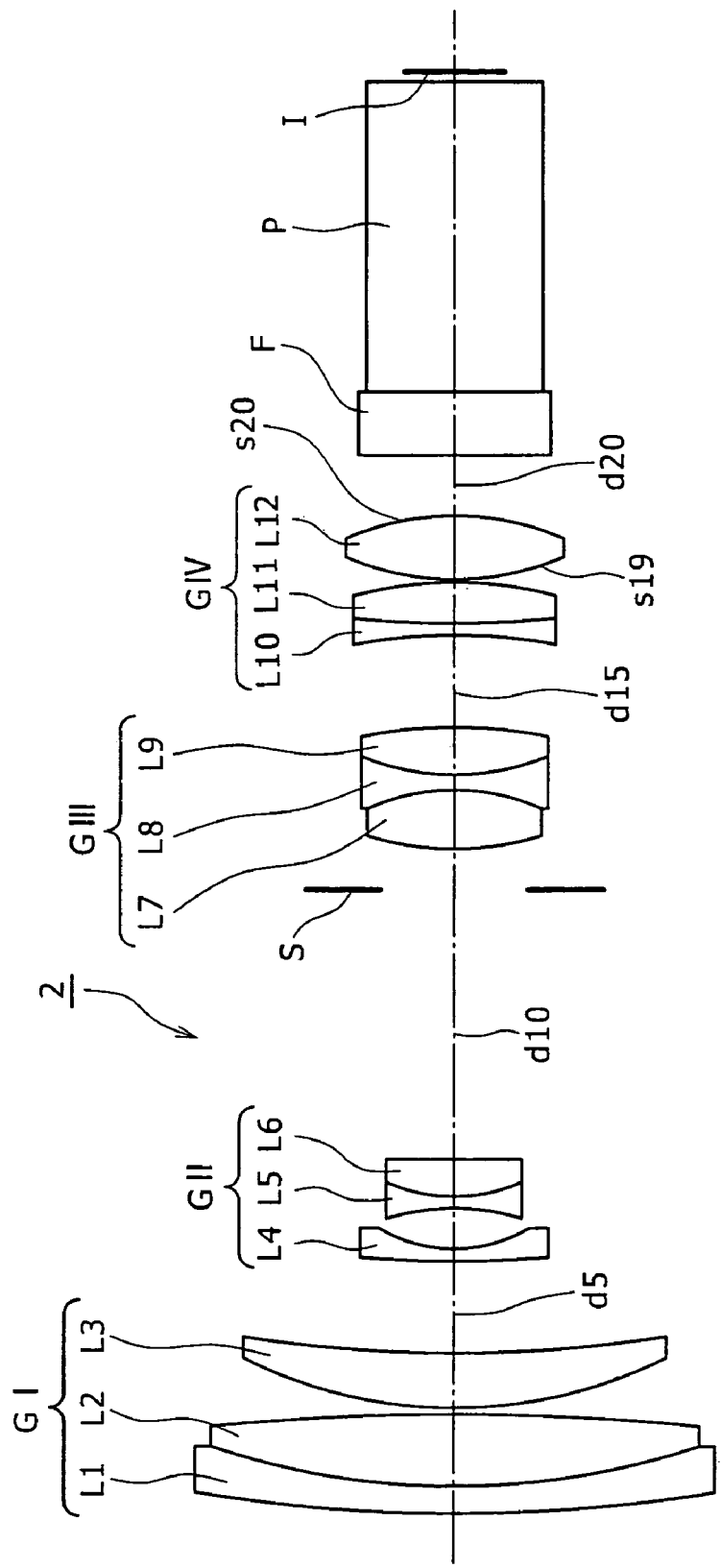
FIG. 10 shows a second embodiment of a zoom lens of the present invention together with FIGS. 11 to 14 and is a view showing a lens configuration.

FIG. 10 is a view showing a lens configuration of a zoom lens 2 according to the second embodiment. The zoom lens 2 is a zoom lens of the so-called four-group inner focus type and includes a first lens group GI having a positive refractive power and having a fixed position, a second lens group GII of the variable magnification type having a negative refractive power and having a position variable for magnification variation, a third lens group GIII having a positive refractive power and having a fixed position, and a fourth lens group GIV having a positive refractive power and having a position variable for adjustment of a focal position upon magnification variation and upon focusing, disposed in order from the object side. The first lens group GI is formed from a cemented lens of a first lens L1 in the form of a concave lens and a second lens L2 in the form of a convex lens and a third lens L3 in the form of a convex meniscus lens having a convex face directed to the object side, disposed in order from the object side. The second lens group GII includes a fourth lens L4 in the form of a concave lens and a cemented lens of a fifth lens L5 in the form of a biconcave lens and a sixth lens L6 in the form of a convex lens, disposed in order from the object side. The third lens group GIII includes a three-element cemented lens of a seventh lens L7 in the form of a biconvex lens, an eighth lens L8 in the form of a biconcave lens and a ninth lens L9 in the form of a biconvex lens, disposed in order from the object side. The fourth lens group GIV includes a cemented lens of a tenth lens L10 in the form of a concave lens having a concave face directed to the object side and an eleventh lens L11 in the form of a convex lens and a twelfth lens L12 in the form of a biconvex lens, disposed in order from the object side. At least one face of the eleventh lens L11 or the twelfth lens L12 is formed from an aspheric face (in a numerical value working example 3 hereinafter described, the opposite faces of the twelfth lens L12 are each formed from an aspheric face). It is to be noted that, while, in the numerical value working example 3 hereinafter described, the third lens group GIII is formed from a three-element cemented lens only of spherical lenses, the face nearest to or farthest from the object side of the third lens group GIII may be formed from an aspheric face.

It is to be noted that, in the zoom lenses 1 and 2, an iris S having a fixed position is positioned in the proximity of the object side of the third lens group GIII, and a color separating prism P is disposed between the fourth lens group GIV and an image forming plane I (in a back focus). Further, a filter F is disposed on the object side of the color separating prism P.

The zoom lens of the present invention makes it possible to insert a color separating prism into the back focus by weakening the refractive index of the third lens group GIII so that a divergent light flux is introduced into the fourth lens group GIV to elongate the back focus. Further, the zoom lens makes it possible to perform correction of the magnification chromatic aberration by configuring the fourth lens group GIV such that the image side principal point cannot be displaced rather near to the image to perform correction of the chromatic aberration rather excessively. Furthermore, the zoom lens achieves both miniaturization and enhancement in performance by configuring the zoom lens so as to satisfy the following conditional expressions (1) to (6) to make the refractive power arrangement and the arrangement of the media appropriate.

$$7.0 < fIII/fw < 10.0 \tag{1}$$

$$0.007 < HIV'/fIV < 0.07 \tag{2}$$

$$1.8 < fIII/fIV < 3.0 \tag{3}$$

$$-0.1 < \phi 32 < -0.05 \tag{4}$$

$$-0.02 < 1/vIV < -0.012 \tag{5}$$

$$0.03 < 1/vIII < 0.07 \tag{6}$$

where fw: focal distance of the entire system at the wide-angle end state fIII: focal distance of the third lens group fIV: focal distance of the fourth lens group HIV': image side principal point of the fourth lens group $\phi 32$: refractive power of the bonded faces of the biconvex lens nearest to the object side in the third lens group and the next concave lens (where $\phi 32=(n8-n7)/r32$ where n7 is the refractive index of the seventh lens on the d line, n8 the refractive index of the eighth lens on the d line, and r32 the radius of curvature of the bonded faces of the seventh lens and the eighth lens), v IV: equivalent Abbe number where it is assumed that the fourth lens group is a thin closely contacting type lens group (where $1/v\ IV=fIV\{1/(f41\cdot v\ 41)+1/(f42\cdot v\ 42)+1/(f43\cdot v\ 43)\}$ where f41 is the focal distance of the concave lens nearest to the object side in the fourth lens group in the air, f42 the focal distance of the convex lens cemented to the above-mentioned concave lens of the fourth lens group in the air, f43 the focal distance of the biconvex lens nearest to the image side in the fourth lens group, v 41 the Abbe number of the material of the concave lens nearest to the object side in the fourth lens group, v 42 the Abbe number of the material of the convex lens cemented to the above-mentioned concave lens of the fourth lens group, and v 43 the Abbe number of the material of the biconvex lens nearest to the image side of the fourth lens group), and v III: equivalent Abbe number where it is assumed that the third lens group is a thin closely contacting lens group (where $1/v\ III=fIII\{1/(f31\cdot v\ 31)\}+1/(f32\ v\ 32)$ in the case wherein the third lens group is a two-element cemented lens but $1/v\ III=fIII\{1/(f31\cdot v\ 31)+1/(f32\cdot v\ 32)+1/(f33\cdot v\ 33)\}$ in the case wherein the third lens group is a three-element cemented lens where f31 is the focal distance of the convex lens nearest to the object side in the third lens group in the air, f32 the focal distance of the concave lens cemented to the above-mentioned convex lens of the third lens group in the air, f33 the focal distance of the convex lens nearest to the image side in the case wherein the third lens group is a three-element cemented lens, ν 31 the Abbe number of the material of the convex lens nearest to the object side in the third lens group, ν 32 the Abbe number of the material of the concave lens cemented to the above-mentioned convex lens of the third lens group, and ν 33 the Abbe number of the material of the convex lens nearest to the image side in the case wherein the third lens group is a three-element cemented lens.

The conditional expression (1) defines the refractive power of the third lens group GIII, and by setting the focal distance fIII of the third lens group GIII longer than the lower limit of the conditional expression (1), the burden on the fourth lens group GIV for making the back focus long can be reduced to enhance the aberration variation caused by movement of the fourth lens group GIV. However, if the upper limit of the conditional expression (1) is exceeded upwardly, then the light flux incoming to the fourth lens group GIV becomes rather excessively divergent and the aberration variation by the movement of the fourth lens group GIV increases.

The conditional expression (2) is provided to achieve both of miniaturization and assurance of a long back focus by means of the fourth lens group GIV, and if a refractive power arrangement proximate to a retrofocus arrangement is adopted when the fourth lens group GIV is viewed by itself, then the back focus of the entire system can be made long although the focal distance of the fourth lens group GIV is small. However, if miniaturization takes precedence and the position of the image side principal point is displaced rather near to the image to such a degree that the upper limit of the conditional expression (2) is exceeded upwardly, then the negative refractive power is concentrated on the object side of the fourth lens group GIV while the positive refractive power is concentrated on the image side, which makes correction of the spherical aberration, coma and curvature of field difficult.

The conditional expression (3) is a condition necessary to achieve both miniaturization and assurance of a long back focus which are effects of the conditional expression (2). If the upper limit of the conditional expression (3) is exceeded upwardly, then the light flux incoming to the fourth lens group GIV becomes thicker and the back focus can be made longer even if the image side principal point of the fourth lens group GIV is set rather near to the image. However, the fourth lens group GIV does not exhibit a retrofocus condition, and the overall length becomes long. If the lower limit of the conditional expression is exceeded downwardly, then the burden on the fourth lens group GIV for making the back focus long increases, which makes correction of the spherical aberration, coma and curvature of field difficult.

The conditional expression (4) is provided to expand a light flux on the bonded faces having a negative refractive power in the third lens group GIII to elongate the back focus and perform correction of the spherical aberration and correction of the Petzval sum. If the third lens group GIII is configured without bonding two or three lenses, then a large number of solutions exist by which the back focus, spherical aberration and Petzval sum described above can be balanced appropriately. However, a lens group wherein the lenses are disposed solely is liable to suffer from eccentricity and it is obliged to take a complicated countermeasure of securing the lens group while adjusting the optical axis upon assembly, which sometimes makes a cause of raising the production cost. However, if the third lens group GIII is formed from a cemented lens, then since it is possible to assemble, at a bonding step, the third lens group GIII so that no deviation of the optical axis may occur using such an apparatus as a centering microscope. Therefore, a stabilized performance can be implemented at a low cost. While the third lens group GIII has a positive refractive power, it is possible to expand a light flux gently to make it possible to elongate the back focus readily and perform correction gently without causing deformation of a spherical aberration curve by disposing the bonded faces having a negative refractive power with the concave face directed toward the iris comparatively nearly to the object within the third lens group GIII. If the upper limit of the conditional expression (4) is exceeded upwardly, then the effect of the bonded faces described hereinabove decreases, and as a result, the burden for making the back focus longer at the fourth lens group GIV increases and good aberration correction becomes difficult. If the lower limit of the conditional expression (4) is exceeded downwardly, then the curvature of the bonded faces becomes excessively strong, which makes working difficult.

The conditional expression (5) relates to correction principally of the magnification chromatic aberration and suppression of the variation by zooming, and if separate roles are assigned to the third lens group GIII and the fourth lens group GIV such that the fourth lens group GIV having a greater ray height of a principal ray attaches importance principally to correction of the magnification chromatic aberration while the third lens group GIII having a smaller ray height of a principal ray performs balancing of the axial chromatic aberration, then not only the axial chromatic aberration but also the magnification chromatic aberration can be corrected effectively in a well-balanced condition over the overall zooming range.

1/ν IV represents a reciprocal number to the equivalent Abbe number when it is assumed that the fourth lens group GIV is a three-element closely-contacting thin lens system. If the focal distances and the Abbe numbers of the lenses are set so that 1/ν IV=0 may be satisfied, then when the fourth lens group GIV is considered by itself, a condition that achromatization of two spectral lines of the F line and the C line can be performed is satisfied. However, the magnification chromatic aberration at the wide-angle end state is generated principally from the second lens group GII, and there is a tendency that the magnification of an image of the g line becomes smaller than that of the d line. In order to correct this, it is necessary to set 1/ν IV in such a manner that correction is performed rather excessively so that 1/ν IV may be lower than the upper limit of the expression (5). Since the exit pupil is near to a telecentric condition, even if the position of the fourth lens group GIV is moved by zooming, the variation of the magnification chromatic aberration is suppressed small. However, if the achromatic condition of the fourth lens group GIV is set to an excessive correction condition to such a degree that the lower limit of the conditional expression (5) is exceeded downwardly, then the magnification chromatic aberration generated from the second lens group GII increases and it becomes obliged to establish a balance. Consequently, the variation of the magnification chromatic aberration during zooming increases.

The conditional expression (6) relates to a balance between the magnification chromatic aberration and the axial chromatic aberration of the third lens group GIII and the fourth lens group GIV which form an image forming system. Since the magnification chromatic aberration is corrected by the fourth lens group GIV in accordance with the conditional expression (5), rather excessively corrected axial chromatic aberration is generated by the fourth lens group GIV. In order to correct the axial chromatic aberration while a correction balance of the magnification chromatic aberration is maintained, it is effective to correct the axial chromatic aberration by means of the third lens group GIII which has a small ray height of a principal ray. Therefore, it is necessary to set the reciprocal number 1/vIII of the equivalent Abbe number when it is assumed that the third lens group GIII is a two-element closely-contacting thin lens system or a three-element closely contacting thin lens system to a value higher than the lower limit of the conditional expression (6) to set the refractive powers and the media of the convex lens and the concave lens in a direction in which the axial chromatic aberration is increased when compared with that by a single lens. If the upper limit of the conditional expression (6) is exceeded, then correction of the axial chromatic aberration becomes insufficient on the wide angle side or it becomes difficult to sufficiently correct the magnification chromatic aberration by means of the fourth lens group GIV.

Further, in order to achieve both miniaturization and good aberration correction, preferably the following conditional expressions (7) and (8) are satisfied:

$$1.77 < (n1+n2+n3)/3 \quad (7)$$

$$1.83 < (n4+n5+n6)/3 \quad (8)$$

where n1: refractive index of the first lens at the d line
n2: refractive index of the second lens at the d line
n3: refractive index of the third lens at the d line
n4: refractive index of the fourth lens at the d line
n5: refractive index of the fifth lens at the d line
n6: refractive index of the sixth lens at the d line.

The conditional expression (7) defines a condition for reducing the total thickness of the first lens group GI to achieve miniaturization and setting the refractive index of the lenses which compose the first lens group GI to a high value so that the curvatures of the faces can be moderated. Where the conditional expression (7) is satisfied, correction of the spherical aberration and the coma at the telescopic end state can be easily facilitated.

The conditional expression (8) defines a condition for preventing the Petzvar sum from increasing to the negative side when the refractive power of the second lens group GII is increased to reduce the space for movement of the second lens group GII to achieve miniaturization. The curvature of the bonded faces of the fifth lens L5 and the sixth lens L6 can be moderated to correct the deformation of the spherical aberration of short wavelengths at the telescopic end state by setting the refractive index of the concave lens which composes the second lens group GII to moderate the curvatures of the faces to correct the Petzvar sum and setting the refractive index of the convex lens to a high value so that a medium whose Abbe number is as low as possible is used.

In the following, several numerical value working examples embodied applying particular numerical values to the zoom lenses 1 and 2 of the present embodiment are described.

It is to be noted that, in the following expression, "si" represents the ith face as counted from the object side; "ri" the radius of curvature of the ith face as counted from the object side; "di" the distance between the ith face and the i+1th face as counted from the object side; "dF" the thickness of the filter F; "dP" the thickness of the color separating prism; "ni" the refractive index of a material used to form the ith lens Li at the d line; "nF" the refractive index of the material used to form the filter F at the d line; "nP" the refractive index of the material used to form the color separating prism at the d line; "v i" the Abbe number of the material used to form the ith lens Li; "v F" the Abbe number used to form the filter F; and "v P" the Abbe number of the material used to form the color separating prism.

Meanwhile, an aspheric shape is defined by Expression 1 where the depth of the aspheric face is represented by "xi" and the height from the optical axis is represented by "H". "E-i" of the aspheric coefficient represents "×10−i".

Expression 1

$$xi = H^2/ri(1+\sqrt{1-H^2/ri^2}) + \Sigma AjH^j$$

Values in the numerical value working example 1 wherein particular numerical values are applied to the zoom lens 1 according to the first embodiment shown in FIG. 1 are indicated in Table 1.

TABLE 1

| si | ri | di | ni | vi |
|---|---|---|---|---|
| 1 | r1 = 23.921 | d1 = 0.350 | n1 = 1.94568 | v1 = 18.0 |
| 2 | r2 = 9.059 | d2 = 0.930 | n2 = 1.72916 | v2 = 54.7 |
| 3 | r3 = −30.993 | d3 = 0.070 | | |
| 4 | r4 = 5.538 | d4 = 0.695 | n3 = 1.83481 | v3 = 42.7 |
| 5 | r5 = 14.863 | d5 = variable | | |
| 6 | r6 = 18.151 | d6 = 0.175 | n4 = 1.88300 | v4 = 40.8 |
| 7 | r7 = 2.324 | d7 = 0.534 | | |
| 8 | r8 = −2.370 | d8 = 0.175 | n5 = 1.88300 | v5 = 40.8 |
| 9 | r9 = 2.264 | d9 = 0.458 | n6 = 1.94568 | v6 = 18.0 |
| 10 | r10 = ∞ | d10 = variable | | |
| 11 | r11 = iris | d11 = 0.594 | | |
| 12 | r12 = 8.031 | d12 = 0.665 | n7 = 1.68893 | v7 = 31.2 |
| 13 | r13 = −2.238 | d13 = 0.553 | n8 = 1.88300 | v8 = 40.8 |
| 14 | r14 = −7.435 | d14 = variable | | |
| 15 | r15 = −4.979 | d15 = 0.175 | n9 = 1.94568 | v9 = 18.0 |
| 16 | r16 = ∞ | d16 = 0.524 | n10 = 1.48749 | v10 = 70.4 |
| 17 | r17 = −3.639 | d17 = 0.070 | | |
| 18 | r18 = 3.120 | d18 = 0.900 | n11 = 1.48749 | v11 = 70.4 |
| 19 | r19 = −3.162 | d19 = variable | | |
| Filter | ∞ | dF = 0.745 | nF = 1.51680 | vF = 64.2 |
| Prism | ∞ | dP = 3.950 | nP = 1.58913 | vP = 61.3 |
| | ∞ | Back focus = 0.280 | | |

In the zoom lens 1, the face distance d5 between the first lens group GI and the second lens group GII, the face distance d10 between the second lens group GII and the iris S, the face distance d14 between the third lens group GIII and the fourth lens group GIV and the face distance d19 between the fourth lens group GIV and the filter F are variable during zooming. Therefore, numerical values of the distances d5, d10 , d14 and d19 in the numerical value working example 1 at the wide-angle end state, intermediate focal position and telescopic end state are indicated in Table 2 together with the focal distance, F number and angle of view (2ω (degrees)).

TABLE 2

| Focal distance | 1.000 | 5.484 | 9.157 |
|---|---|---|---|
| F number | 1.85 | 2.10 | 2.40 |
| 2ω(degrees) | 57.80 | 10.9 | 6.48 |
| d5 | 0.298 | 3.625 | 4.300 |
| d10 | 4.351 | 1.024 | 0.349 |
| d14 | 1.548 | 0.715 | 1.040 |
| d19 | 0.512 | 1.345 | 1.020 |

In the numerical value working example 1, the face s12 of the seventh lens L7 on the object side and the opposite faces s18 and s19 of the eleventh lens L11 are each formed from an aspheric face. Therefore, fourth-, sixth-, eighth- and tenth-order aspheric coefficients A4, A6, A8 and A10 of the faces s12, s18 and s19 are indicated in Table 3.

TABLE 3

| si | A4 | A6 | A8 | A10 |
|---|---|---|---|---|
| 12 | −0.1078E−02 | 0.2648E−02 | −0.4885E−02 | 0.2391E−02 |
| 18 | −0.8364E−02 | −0.3433E−03 | 0.3447E−03 | −0.1030E−03 |
| 19 | 0.8743E−02 | | | |

Aberration diagrams of the numerical value working example 1 are shown in FIGS. 2 to 5. In particular, FIGS. 2, 3 and 4 indicate the spherical aberration, astigmatism and distortion aberration at the wide-angle end state, intermediate focal position and telescopic end state, respectively, and FIG. 5 indicates lateral aberration at 80% of an image height. It is to be noted that, in the spherical aberration diagrams and the lateral aberration diagrams, a solid line indicates an aberration curve at the d line (wavelength of 587.6 nm), a broken line indicates an aberration curve at the g line (wavelength of 435.8 nm) and an alternate long and short dash line indicates an aberration curve at the C line (wavelength of 656.3 nm). Meanwhile, in the astigmatism diagrams, a solid line indicates a sagittal image plane, and a broken line indicates a meridional image plane.

Now, values in the numerical value working example 2 wherein particular numerical values different from those of the numerical value working example 1 are applied to the zoom lens 1 according to the first embodiment shown in FIG. 1 are indicated in Table 4.

TABLE 4

| si | ri | di | ni | vi |
|---|---|---|---|---|
| 1 | r1 = 22.383 | d1 = 0.306 | n1 = 1.94568 | v1 = 18.0 |
| 2 | r2 = 8.720 | d2 = 0.878 | n2 = 1.72916 | v2 = 54.7 |
| 3 | r3 = −28.336 | d3 = 0.068 | | |
| 4 | r4 = 5.482 | d4 = 0.653 | n3 = 1.83481 | v3 = 42.7 |
| 5 | r5 = 14.158 | d5 = variable | | |
| 6 | r6 = 14.158 | d6 = 0.170 | n4 = 1.88300 | v4 = 40.8 |
| 7 | r7 = 2.255 | d7 = 0.510 | | |
| 8 | r8 = −2.342 | d8 = 0.170 | n5 = 1.88300 | v5 = 40.8 |
| 9 | r9 = 2.268 | d9 = 0.426 | n6 = 1.94568 | v6 = 18.0 |
| 10 | r10 = ∞ | d10 = variable | | |
| 11 | r11 = iris | d11 = 0.578 | | |
| 12 | r12 = 6.308 | d12 = 0.718 | n7 = 1.64769 | v7 = 33.8 |
| 13 | r13 = −1.941 | d13 = 0.408 | n8 = 1.77377 | v8 = 47.2 |
| 14 | r14 = −8.501 | d14 = variable | | |
| 15 | r15 = −4.469 | d15 = 0.170 | n9 = 1.94568 | v9 = 18.0 |
| 16 | r16 = 110.433 | d16 = 0.503 | n10 = 1.48749 | v10 = 70.4 |
| 17 | r17 = −3.368 | d17 = 0.068 | | |
| 18 | r18 = 3.619 | d18 = 0.731 | n11 = 1.58313 | v11 = 59.5 |
| 19 | r19 = −3.619 | d19 = variable | | |
| Filter | ∞ | dF = 0.724 | nF = 1.51680 | vF = 64.2 |
| Prism | ∞ | dP = 3.842 | nP = 1.58913 | vP = 61.3 |
| | ∞ | Back focus = 0.280 | | |

In the zoom lens 1, the face distance d5 between the faces of the first lens group GI and the second lens group GII, the face distance d10 between the second lens group GII and the iris S, the face distance d14 between the third lens group GIII and the fourth lens group GIV and the face distance d19 between the fourth lens group GIV and the filter F are variable during zooming. Therefore, numerical values of the face distances d5, d10, d14 and d19 in the numerical value working example 2 at the wide-angle end state, intermediate focal position and telescopic end state are indicated in Table 5 together with the focal distance, F number and angle of view (2ω (degrees)).

TABLE 5

| Focal distance | 1.000 | 5.182 | 9.170 |
|---|---|---|---|
| F number | 1.85 | 2.10 | 2.40 |
| 2ω(degrees) | 56.20 | 11.2 | 6.28 |
| d5 | 0.289 | 3.512 | 4.247 |
| d10 | 4.383 | 1.160 | 0.425 |
| d14 | 1.613 | 0.853 | 1.223 |
| d19 | 0.533 | 1.293 | 0.923 |

In the numerical value working example 2, the face s14 of the eighth lens L8 on the object side and the opposite faces s18 and s19 of the eleventh lens L11 are each formed from an aspheric face. Therefore, fourth-, sixth-, eighth- and tenth-order aspheric coefficients A4, A6, A8 and A10 of the faces s14, s18 and s19 are indicated in Table 6.

TABLE 6

| si | A4 | A6 | A8 | A10 |
|---|---|---|---|---|
| 14 | −0.4697E−03 | 0.2044E−03 | | |
| 18 | −0.6274E−02 | 0.6343E−04 | | |
| 19 | 0.6274E−02 | −0.6343E−04 | | |

Aberration diagrams of the numerical value working example 2 are shown in FIGS. 6 to 9. In particular, FIGS. 6, 7 and 8 indicate the spherical aberration, astigmatism and distortion aberration at the wide-angle end state, intermediate focal position and telescopic end state, respectively, and FIG. 9 indicates lateral aberration at 80% of an image height. It is to be noted that, in the spherical aberration diagrams and the lateral aberration diagrams, a solid line indicates an aberration curve at the d line (wavelength of 587.6 nm), a broken line indicates an aberration curve at the g line (wavelength of 435.8 nm) and an alternate long and short dash line indicates an aberration curve at the C line (wavelength of 656.3 nm). Meanwhile, in the astigmatism diagrams, a solid line indicates a sagittal image plane, and a broken line indicates a meridional image plane.

Further, values in the numerical value working example 3 wherein particular numerical values are applied to the zoom lens 2 according to the second embodiment shown in FIG. 10 are indicated in Table 7.

TABLE 7

| si | ri | di | ni | vi |
|---|---|---|---|---|
| 1 | r1 = 21.367 | d1 = 0.305 | n1 = 1.94568 | v1 = 18.0 |
| 2 | r2 = 8.425 | d2 = 0.894 | n2 = 1.72916 | v2 = 54.7 |
| 3 | r3 = −28.253 | d3 = 0.068 | | |
| 4 | r4 = 5.324 | d4 = 0.651 | n3 = 1.83481 | v3 = 42.7 |
| 5 | r5 = 13.742 | d5 = variable | | |
| 6 | r6 = 13.742 | d6 = 0.170 | n4 = 1.88300 | v4 = 40.8 |
| 7 | r7 = 2.178 | d7 = 0.497 | | |
| 8 | r8 = −2.243 | d8 = 0.170 | n5 = 1.88300 | v5 = 40.8 |
| 9 | r9 = 2.152 | d9 = 0.440 | n6 = 1.94568 | v6 = 18.0 |
| 10 | r10 = ∞ | d10 = variable | | |
| 11 | r11 = iris | d11 = 0.576 | | |
| 12 | r12 = 4.317 | d12 = 0.712 | n7 = 1.64769 | v7 = 33.8 |
| 13 | r13 = −2.188 | d13 = 0.170 | n8 = 1.83481 | v8 = 42.7 |
| 14 | r14 = 2.787 | d14 = 0.606 | n9 = 1.70154 | v9 = 41.2 |
| 15 | r15 = −6.203 | d15 = variable | | |
| 16 | r16 = −5.611 | d16 = 0.170 | n10 = 1.94568 | v10 = 18.0 |
| 17 | r17 = 20.608 | d17 = 0.480 | n11 = 1.48749 | v11 = 70.4 |
| 18 | r18 = −4.097 | d18 = 0.068 | | |

TABLE 7-continued

| si | ri | di | ni | vi |
|---|---|---|---|---|
| 19 | r19 = 3.544 | d19 = 0.739 | n12 = 1.58313 | v12 = 59.5 |
| 20 | r20 = −3.544 | d20 = variable | | |
| Filter | ∞ | dF = 0.722 | nF = 1.51680 | vF = 64.2 |
| Prism | ∞ | dP = 3.831 | nP = 1.58913 | vP = 61.3 |
| | ∞ | Back focus = 0.280 | | |

In the zoom lens 2, the face distance d5 between the faces of the first lens group GI and the second lens group GII, the face distance d10 between the second lens group GII and the iris S, the face distance d15 between the third lens group GIII and the fourth lens group GIV and the face distance d20 between the fourth lens group GIV and the filter F are variable during zooming. Therefore, numerical values of the distances d5, d10, d15 and d20 in the numerical value working example 3 at the wide-angle end state, intermediate focal position and telescopic end state are indicated in Table 8 together with the focal distance, F number and angle of view (2ω (degrees)).

TABLE 8

| Focal distance | 1.000 | 5.242 | 9.160 |
|---|---|---|---|
| F number | 1.85 | 2.10 | 2.40 |
| 2ω(degrees) | 56.00 | 11.0 | 6.26 |
| d5 | 0.305 | 3.420 | 4.115 |
| d10 | 4.234 | 1.119 | 0.424 |
| d15 | 1.353 | 0.560 | 0.931 |
| d20 | 0.530 | 1.323 | 0.952 |

In the numerical value working example 3, the opposite faces s19 and s20 of the twelfth lens L12 are each formed from an aspheric face. Therefore, fourth-, sixth-, eighth-, and tenth-order aspheric coefficients A4, A6, A8 and A10 of the faces s19 and s20 are indicated in Table 9.

TABLE 9

| si | A4 | A6 | A8 | A10 |
|---|---|---|---|---|
| 19 | −0.6545E−02 | 0.5926E−04 | | |
| 20 | 0.6545E−02 | −0.5926E−04 | | |

Aberration diagrams of the numerical value working example 3 are shown in FIGS. 11 to 14. In particular, FIGS. 11, 12 and 13 indicate the spherical aberration, astigmatism and distortion aberration at the wide-angle end state, intermediate focal position and telescopic end state, respectively, and FIG. 14 indicates lateral aberration at 80% of an image height. It is to be noted that, in the spherical aberration diagrams and the lateral aberration diagrams, a solid line indicates an aberration curve at the d line (wavelength of 587.6 nm), a broken line indicates an aberration curve at the g line (wavelength of 435.8 nm) and an alternate long and short dash line indicates an aberration curve at the C line (wavelength of 656.3 nm). Meanwhile, in the astigmatism diagrams, a solid line indicates a sagittal image plane, and a broken line indicates a meridional image plane.

Corresponding numerical values in the numerical value working examples 1, 2 and 3 of the conditional expressions given hereinabove are indicated in Table 10.

TABLE 10

| | Numerical value example 1 | Numerical value example 2 | Numerical value example 3 |
|---|---|---|---|
| fw | 1.000 | 1.000 | 1.000 |
| fIII | 8.571 | 7.891 | 7.713 |
| fIII/fw | 8.571 | 7.891 | 7.713 |
| fIV | 3.558 | 3.493 | 3.524 |
| HIV' | 0.041 | 0.142 | 0.096 |
| HIV'/fIV | 0.0115 | 0.0407 | 0.0272 |
| fIII/fIV | 2.409 | 2.259 | 2.189 |
| n7 | 1.68893 | 1.64769 | 1.64769 |
| n8 | 1.88300 | 1.77377 | 1.83481 |
| r32 | −2.238 | −1.941 | −2.188 |
| φ32 | −0.0867 | −0.0650 | −0.0855 |
| f41 | −5.265 | −4.539 | −4.649 |
| f42 | 7.465 | 6.714 | 7.056 |
| f43 | 3.380 | 3.223 | 3.160 |
| v41 | 18.0 | 18.0 | 18.0 |
| v42 | 70.4 | 70.4 | 70.4 |
| v43 | 70.4 | 59.5 | 59.5 |
| 1/vIV | −0.0158 | −0.0171 | −0.0163 |
| f31 | 2.610 | 2.373 | 2.343 |
| f32 | −3.816 | −3.341 | −1.446 |
| f33 | | | 2.820 |
| v31 | 31.2 | 33.8 | 33.8 |
| v32 | 40.8 | 47.2 | 42.7 |
| v33 | | | 41.2 |
| 1/vIII | 0.0502 | 0.0483 | 0.0389 |
| (n1 + n2 + n3)/3 | 1.83655 | 1.83655 | 1.83655 |
| (n4 + n5 + n6)/3 | 1.90389 | 1.90389 | 1.90389 |

As can be recognized from the numerical value working example 1, numerical value working example 2 and numerical value working example 3 described above, the zoom lenses 1 and 2 according to the present invention achieve miniaturization by placing the image side principal point of the fourth lens group GIV on the image side while a function that a long back focus for inserting a color separating prism necessary for a three-plate type video camera therein and the exit pupil are proximate to telecentric conditions. Further, since the bonded faces having a negative refractive power are disposed in the third lens group GIII, the freedom in design of magnification aberration correction by the fourth lens group GIV can be increased significantly to correct various aberrations including the magnification chromatic aberration well on a high level. Furthermore, further miniaturization and enhancement in performance are implemented by using a high refractive index glass material for the first lens group GI and the second lens group GII.

Further, the zooming ratio is as high as approximately 10 times and a brightness of F1.8 at the wide-angle end state is achieved, and as can be seen from the aberration diagrams, various aberrations including the magnification chromatic aberration are corrected very well.

Furthermore, a cemented lens is disposed efficiently in the third lens group GIII and the fourth lens group GIV which are principal characteristics of the present invention to achieve a role of moderating the sensitivity to degradation in performance by an error upon manufacture when compared with that where the third lens group GIII and the fourth lens group GIV are separated into and disposed as individual single lenses.

FIG. 15 shows an embodiment of an image pickup apparatus of the present invention.

The image pickup apparatus 10 according to the present embodiment includes, where it is roughly divided as seen in FIG. 15, a camera section 20, a camera DSP (Digital Signal Processor) 30, an SDRAM (Synchronous Dynamic Random Access Memory) 40, a medium interface (hereinafter referred to as medium I/F) 50, a control section 60, an operation section 70, an LCD (Liquid Crystal Display) 80, and an external interface (hereinafter referred to as external I/F) 90. A recording medium 100 is removably loaded into the image pickup apparatus 10.

For the recording medium 100, recording media of various types such as a so-called memory card in which a semiconductor memory is used, an optical recording medium such as a recordable DVD (Digital Versatile Disk) or a recordable CD (Compact disk) and a magnetic disk can be used. However, in the description of the present embodiment, it is described that, for example, a memory card is used as the recording medium 100.

The camera section 20 includes an optical block 21, a CCD (Charge Coupled Device) 22, a pre-processing circuit 23, an optical block driver 24, a CCD driver 25, a timing generation circuit 26 and so forth. The optical block 21 includes a lens, a focusing mechanism, a shutter mechanism, a diaphragm (iris) mechanism and so forth. For the lens in the optical block 21, a zoom lens according to the present invention such as the zoom lens 1 or 2 described hereinabove is used. After images separated for the individual colors of R, G and B are fetched, where the images of the colors are to be superposed with each other to produce information of a single color image, CCD's 22 are provided individually for the colors of R, G and B.

The control section 60 is a microcomputer formed from a CPU (Central Processing Unit) 61, a RAM (Random Access Memory) 62, a flash ROM (Read Only Memory) 63, a clock circuit 64 and so forth connected to each other by a system bus 65. The control section 60 can control the components of the image pickup apparatus 10 of the present embodiment.

The RAM 62 is used principally as a working area for temporarily storing an intermediate result of processing and so forth. The flash ROM 63 has stored therein various programs to be executed by the CPU 61, data necessary for the processing and so forth. Further, the clock circuit 64 can provide the year, month and day at present, the day of the week at present and the time at present and can provide the image pickup day and time.

Then, when an image is to be picked up, the optical block driver 24 forms a driving signal for causing the optical block 21 to operate and supplies the driving signal to the optical block 21 to cause the optical block 21 to operate under the control of the control section 60. The focusing mechanism, shutter mechanism and iris mechanism of the optical block 21 are controlled in response to driving signals from the optical block driver 24 such that the optical block 21 fetches and provides an image of a subject to the CCD 22.

The CCD 22 photoelectrically converts the image from the optical block 21 and outputs the image after the conversion. The CCD 22 operates in response to a driving signal from the CCD driver 25 to fetch the image of the subject from the optical block 21 and supplies the fetched image (image information) of the subject as an electric signal to the pre-processing circuit 23 based on a timing signal from the timing generation circuit 26 controlled by the control section 60.

It is to be noted that, as described hereinabove, the timing generation circuit 26 forms timing signals for providing predetermined timings under the control of the control section 60. Further, the CCD driver 25 forms a driving signal to be supplied to the CCD 22 based on a timing signal from the timing generation circuit 26.

The pre-processing circuit 23 performs a CDS (Correlated Double Sampling) process for the image information of the electric signal supplied thereto to maintain the S/N ratio at a good value and performs an AGC (Automatic Gain Control) process to control the gain and further performs A/D (Analog/Digital) conversion to form image data in the form of a digital signal.

The image data in the form of a digital signal from the pre-processing circuit 23 are supplied to the camera DSP 30. The camera DSP 30 performs camera signal processes such as AF (Auto Focus), AE (Auto Exposure) and AWB (Auto White Balance) processes for the image data supplied thereto. The image data for which such various adjustments have been performed in this manner are compressed in accordance with a predetermined compression method and supplied to the recording medium 100 loaded in the image pickup apparatus 10 of the present embodiment through the system bus 65 and the medium I/F 50 so that they are recorded as a file on the recording medium 100 as hereinafter described.

Object image data from among the image data recorded on the recording medium 100 are read out from the recording medium 100 through the medium I/F 50 in response to an operation input from a user accepted through the operation section 70 which is formed from a touch panel, control keys and so forth. The read out object data are supplied to the camera DSP 30.

The camera DSP 30 performs, for the image data in the form of compressed data read out from the recording medium 100 and supplied through the ] medium I/F 50, a depression process (decompression process) and supplies the image data after the depression to an LCD controller 81 through the system bus 65. The LCD controller 81 forms an image signal to be supplied to the LCD 80 from the image data supplied thereto and supplies the image signal to the LCD 80. Consequently, an image corresponding to the image data recorded on the recording medium 100 is displayed on the display screen of the LCD 80.

It is to be noted that the displaying form of the image conforms to a display processing program recorded in the ROM. In short, the display processing program is a program representing in what mechanism a file system hereinafter described is recorded and in what manner an image is reproduced.

Further, the image pickup apparatus 10 according to the present embodiment includes an external I/F 90. It is possible to connect the image pickup apparatus 10, for example, to an external personal computer through the external I/F 90 to receive a supply of image data from the personal computer and record the image data on the recording medium 100 loaded in the image pickup apparatus 10. Also it is possible to supply image data recorded on the recording medium 100 loaded in the image pickup apparatus 10 to the external personal computer or the like through the external I/F 90.

Further, if a communication module is connected to the external I/F 90, then it is possible to connect the image pickup apparatus 10 to a network such as, for example, to the Internet to acquire various image data or some other information through the network and record the acquired image data or information on the recording medium 100 loaded in the image pickup apparatus 10 or transmit data recorded on the recording medium 100 loaded in the image pickup apparatus 10 to an object opposite party through the network.

Further, also information such as image data acquired through the external personal computer or the network and recorded on the recording medium can be read out and reproduced by the image pickup apparatus of the present embodiment and displayed on the LCD 80 as described above so that the user can utilize the information.

It is to be noted that it is possible to provide the external I/F 90 as a wire interface such as IEEE (Institute of Electrical and Electronics Engineers) 1394 and USB (Universal Serial Bus) or provide the external I/F 90 as a radio interface by light or radio waves. In other words, the external I/F 90 may be any of wire and radio interfaces.

In this manner, the image pickup apparatus 10 according to the present embodiment can pick up an image of a subject and record the image on the recording medium 100 loaded in the image pickup apparatus 10. Further, the image pickup apparatus 10 can read out image data recorded on the recording medium 100 and reproduce and utilize the image data. Further, the image pickup apparatus 10 can receive provision of image data through the external personal computer or the network and record the image data on the recording medium 100 loaded in the image pickup apparatus 10 or read out and reproduce the image data.

It is to be noted that, while a CCD unit is used as the image pickup section of the image pickup apparatus 10 described above, this does not signify that the image pickup means of the image pickup apparatus of the present invention is limited to a CCD unit. In addition to a CCD unit, also a CMOS (Complementary Metal-Oxide Semiconductor) image pickup device and other image pickup devices are used.

It is to be noted that particular shapes, structures and numerical values of the components of the embodiments and the numerical value working examples described above indicate a mere example in carrying out the invention, and the technical scope of the present invention shall not be interpreted restrictively by them.

INDUSTRIAL APPLICABILITY

A zoom lens according to the present invention is suitably applied where a long back focus is required in order to insert a color separating prism into a back focus or the like, and can achieve a high magnification and a high performance with a small size while assuring a long back focus. Further, the zoom lens is suitably applied particularly to a three-plate type video camera.

The invention claimed is:

1. A zoom lens wherein a first lens group having a positive refractive power and having a fixed position, a second lens group of the variable magnification type having a negative refractive power and having a position movable for magnification variation, a third lens group having a positive refractive power and having a fixed position and a fourth lens group having a positive refractive power and having a position variable for adjustment of a focal position upon magnification variation and upon focusing are disposed in order from an object side, wherein:

said first lens group includes a cemented lens of a first lens in the form of a concave lens and a second lens in the form of a convex lens and a third lens in the form of a convex meniscus lens having a convex face directed to the object side, disposed in order from the object side;

said second lens group includes a fourth lens in the form of a concave lens and a cemented lens of a fifth lens in the form of a biconcave lens and a sixth lens in the form of a convex lens, disposed in order from the object side;

said third lens group includes a two-element or three-element cemented lens including a seventh lens in the form of a biconvex lens positioned nearest to the object side and an eighth lens in the form of a concave lens bonded to said seventh lens;

said fourth lens group includes a cemented lens of a concave lens having a concave face directed to the object side and a convex lens and a biconvex lens, and at least one face of the two convex lenses in said fourth lens group is formed from an aspheric face; and the following conditional expressions (1), (2), (3), (4), (5) and (6) are satisfied:

$$7.0 < fIII/fw < 10.0 \tag{1}$$

$$0.007 < HIV'/fIV < 0.07 \tag{2}$$

$$1.8 < fIII/fIV < 3.0 \tag{3}$$

$$-0.1 < \phi 32 < -0.05 \tag{4}$$

$$-0.02 < 1/vIV < -0.012 \tag{5}$$

$$0.03 < 1/vIII < 0.07 \tag{6}$$

where fw: focal distance of the entire system at the wide-angle end state fIII: focal distance of said third lens group fIV: focal distance of said fourth lens group HIV': image side principal point of said fourth lens group $\phi 32$: refractive power of the bonded faces of the biconvex lens nearest to the object side in said third lens group and the next concave lens (where $\phi 32=(n8-n7)/r32$ where n7 is the refractive index of said seventh lens on the d line, n8 the refractive index of said eighth lens on the d line, and r32 the radius of curvature of the bonded faces-of said seventh lens and said eighth lens)

v IV: equivalent Abbe number where it is assumed that said fourth lens group is a thin closely contacting type lens group (where $1/v\ IV=fIV\{1/(f41 \cdot v\ 41)+1/(f42 \cdot v\ 42)+1/(f43 \cdot v\ 43)\}$ where f41 is the focal distance of the concave lens nearest to the object side in said fourth lens group in the air, f42 the focal distance of the convex lens cemented to the above-mentioned concave lens in said fourth lens group in the air, f43 the focal distance of the biconvex lens nearest to the image side in said fourth lens group, v 41 the Abbe number of the material of the concave lens nearest to the object side in said fourth lens group, v 42 the Abbe number of the material of the convex lens cemented to the concave lens of said fourth lens group, and v 43 the Abbe number of the material of the biconvex lens nearest to the image side of said fourth lens group)

v III: equivalent Abbe number where it is assumed that said third lens group is a thin closely contacting lens group (where $1/v\ III=fIII\{1/(f31 \cdot v\ 31)+1/(f32 \cdot v\ 32)\}$ in the case wherein said third lens group is a two-element cemented lens but $1/v\ III=fIII\{1/(f31 \cdot v\ 31)+1/(f32 \cdot v\ 32)+1/(f33 \cdot v\ 33)\}$ in the case wherein said third lens group is a three-element cemented lens where f31 is the focal distance of the convex lens nearest to the object side in said third lens group in the air, f32 the focal distance of the concave lens cemented to the above-mentioned convex lens of said third lens group in the air, f33 the focal distance of the convex lens nearest to the image side in the case wherein said third lens group is a three-element cemented lens, v 31 the Abbe number of the material of the convex lens nearest to the object side in said third lens group, v 32 the Abbe number of the material of the concave lens cemented to the convex lens of said third lens group, and v 33 the Abbe number of the material of the convex lens nearest to the image side in the case wherein said third lens group is a three-element cemented lens.

2. The zoom lens according to claim 1, wherein said first lens group and said second lens group satisfy the following conditional expressions (7) and (8):

$$1.77 < (n1+n2+n3)/3 \quad (7)$$

$$1.83 < (n4+n5+n6)/3 \quad (8)$$

where
- n1: refractive index of said first lens at the d line
- n2: refractive index of said second lens at the d line
- n3: refractive index of said third lens at the d line
- n4: refractive index of said fourth lens at the d line
- n5: refractive index of said fifth lens at the d line
- n6: refractive index of said sixth lens at the d line.

3. The zoom lens according to claim 2, wherein said third lens group includes a cemented lens of a seventh lens in the form of a biconvex lens whose face on the object side is formed as an aspheric face and an eighth lens in the form of a concave lens, disposed in order from the object side.

4. The zoom lens according to claim 2, wherein said third lens group includes a cemented lens of a seventh lens in the form of a biconvex lens and an eighth lens in the form of a concave meniscus lens whose face on the image side is formed as an aspheric face, disposed in order from the object side.

5. The zoom lens according to claim 2, wherein said third lens group includes a three-element cemented lens of a seventh lens in the form of a biconvex lens, an eighth lens in the form of a biconcave lens and a ninth lens in the form of a biconvex lens, disposed in order from the object side.

6. The zoom lens according to claim 1, wherein said third lens group includes a cemented lens of a seventh lens in the form of a biconvex lens whose face on the object side is formed as an aspheric face and an eighth lens in the form of a concave lens, disposed in order from the object side.

7. The zoom lens according to claim 1, wherein said third lens group includes a cemented lens of a seventh lens in the form of a biconvex lens and an eighth lens in the form of a concave meniscus lens whose face on the image side is formed as an aspheric face, disposed in order from the object side.

8. The zoom lens according to claim 1, wherein said third lens group includes a three-element cemented lens of a seventh lens in the form of a biconvex lens, an eighth lens in the form of a biconcave lens and a ninth lens in the form of a biconvex lens, disposed in order from the object side.

9. An image pickup apparatus which includes a zoom lens wherein a first lens group having a positive refractive power and having a fixed position, a second lens group of the variable magnification type having a negative refractive power and having a position movable for magnification variation, a third lens group having a positive refractive power and having a fixed position and a fourth lens group having a positive refractive power and having a position variable for adjustment of a focal position upon magnification variation and upon focusing are disposed in order from an object side, and an image pickup section for picking up an optical image formed by said zoom lens, wherein:

said first lens group in said zoom lens includes a cemented lens of a first lens in the form of a concave lens and a second lens in the form of a convex lens and a third lens in the form of a convex meniscus lens having a convex face directed to the object side, disposed in order from the object side;

said second lens group includes a fourth lens in the form of a concave lens and a cemented lens of a fifth lens in the-form of a biconcave lens and a sixth lens in the form of a convex lens, disposed in order from the object side;

said third lens group includes a two-element or three-element cemented lens including a seventh lens in the form of a biconvex lens positioned nearest to the object side and an eighth lens in the form of a concave lens bonded to said seventh lens;

said fourth lens group includes a cemented lens of a concave lens having a concave face directed to the object side and a convex lens and a biconvex lens, and at least one face of the two convex lenses in said fourth lens group is formed from an aspheric face; and the following conditional expressions (1), (2), (3), (4), (5) and (6) are satisfied:

$$7.0 < fIII/fw < 10.0 \quad (1)$$

$$0.007 < HIV'/fIV < 0.07 \quad (2)$$

$$1.8 < fIII/fIV < 3.0 \quad (3)$$

$$-0.1 < \phi 32 < -0.05 \quad (4)$$

$$-0.02 < 1/vIV < -0.012 \quad (5)$$

$$0.03 < 1/vIII < 0.07 \quad (6)$$

where
- fw: focal distance of the entire system at the wide-angle end state
- fIII: focal distance of said third lens group
- fIV: focal distance of said fourth lens group
- HIV': image side principal point of said fourth lens group
- $\phi 32$: refractive power of the bonded faces of the biconvex lens nearest to the object side in said third lens group and the next concave lens (where $\phi 32=(n8-n7)/r32$ where n7 is the refractive index of said seventh lens on the d line, n8 the refractive index of said eighth lens on the d line, and r32 the radius of curvature of the bonded faces of said seventh lens and said eighth lens)
- v IV: equivalent Abbe number where it is assumed that said fourth lens group is a thin closely contacting type lens group (where $1/v\ IV=fIV\{1/(f41\cdot v\ 41)+1/(f42\cdot v\ 42)+1/(f43\cdot v\ 43)\}$ where f41 is the focal distance of the concave lens nearest to the object side in said fourth lens group in the air, f42 the focal distance of the convex lens cemented to the above-mentioned concave lens in said fourth lens group in the air, f43 the focal distance of the biconvex lens nearest to the image side in said fourth lens group, v 41 the Abbe number of the material of the concave lens nearest to the object side in said fourth lens group, v 42 the Abbe number of the material of the convex lens cemented to the concave lens of said fourth lens group, and v 43 the Abbe number of the material of the biconvex lens nearest to the image side of said fourth lens group)
- v III: equivalent Abbe number where it is assumed that said third lens group is a thin closely contacting lens group (where $1/v\ III=fIII\{1/(f31\cdot v\ 31)+1/(f32\cdot v\ 32)\}$ in the case wherein said third lens group is a two-element cemented lens but $1/v\ III=fIII\{1/(f31\cdot v\ 31)+1/(f32\cdot v\ 32)+1/(f33\cdot v\ 33)\}$ in the case wherein said third lens group is a three-element cemented lens where f31 is the focal distance of the convex lens nearest to the object side in said third lens group in the air, f32 the focal distance of the concave lens cemented to the above-mentioned convex lens of said third lens group in the air, f33 the focal distance of the convex lens nearest to the image side in the case wherein said third lens group is a three-element cemented lens, ν31 the Abbe number of the material of the convex lens nearest to the object side in said third lens group, ν32 the Abbe number of the material of the concave lens cemented to the convex lens of said third lens group, and ν33 the Abbe number of the material of the convex lens nearest to the image side in the case wherein said third lens group is a three-element cemented lens.

10. The image pickup apparatus according to claim 9, wherein said first lens group and said second lens group satisfy the following conditional expressions (7) and (8):

$$1.77 < (n1+n2+n3)/3 \tag{b 7}$$

$$1.83 < (n4+n5+n6)/3 \tag{8}$$

where
- n1: refractive index of said first lens at the d line
- n2: refractive index of said second lens at the d line
- n3: refractive index of said third lens at the d line
- n4: refractive index of said fourth lens at the d line
- n5: refractive index of said fifth lens at the d line
- n6: refractive index of said sixth lens at the d line.

* * * * *